United States Patent
Chen et al.

(10) Patent No.: US 10,474,018 B2
(45) Date of Patent: Nov. 12, 2019

(54) ILLUMINATION SYSTEM, CONTROL UNIT THEREOF AND PROJECTION APPARATUS USING THE SAME

(71) Applicant: Coretronic Corporation, Hsin-Chu (TW)

(72) Inventors: Chang-Hsuan Chen, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/379,809

(22) Filed: Apr. 10, 2019

(65) Prior Publication Data
US 2019/0317388 A1    Oct. 17, 2019

(30) Foreign Application Priority Data

Apr. 11, 2018  (CN) .......................... 2018 1 0320098
Nov. 1, 2018  (CN) ...................... 2018 2 1792210 U

(51) Int. Cl.
*G03B 21/20*   (2006.01)
*G02B 26/00*   (2006.01)

(52) U.S. Cl.
CPC ....... *G03B 21/2013* (2013.01); *G02B 26/008* (2013.01); *G03B 21/204* (2013.01); *G03B 21/208* (2013.01)

(58) Field of Classification Search
CPC .............. G03B 21/2013; G03B 21/208; G03B 21/204; G02B 26/008
See application file for complete search history.

(56) References Cited

U.S. PATENT DOCUMENTS

| | | | |
|---|---|---|---|
| 2011/0116253 A1 | 5/2011 | Sugiyama | |
| 2013/0322056 A1 | 12/2013 | Konuma et al. | |
| 2014/0118991 A1* | 5/2014 | Lin | G02B 26/008 362/84 |
| 2018/0203337 A1* | 7/2018 | Wang | G03B 33/08 |

(Continued)

FOREIGN PATENT DOCUMENTS

| CN | 204593250 U | 8/2015 |
|---|---|---|
| CN | 105278226 A | 1/2016 |

(Continued)

*Primary Examiner* — Dedei K Hammond
*Assistant Examiner* — Raymond R Chai

(57) ABSTRACT

An illumination system includes a first exciting light source, a second exciting light source and a wavelength-converting wheel. The first exciting light source provides a first exciting beam. The second exciting light source provides a second exciting beam. The wavelength-converting wheel is disposed on a transmission path of the first exciting beam and the second exciting beam. The wavelength-converting wheel has a first annular irradiation portion and a second annular irradiation portion. The first annular irradiation portion has a first light reflecting region and a first light converting region. The second annular irradiation portion has a second light reflecting region and a second light converting region. The invention further provides a control unit and a projection apparatus. The invention can adjust the color proportion of the illumination beam projected by the illumination system, and reduce the volume of the illumination system and the number of optical components.

28 Claims, 31 Drawing Sheets

(56) References Cited

U.S. PATENT DOCUMENTS

| | | | |
|---|---|---|---|
| 2018/0299662 A1* | 10/2018 | Maes | G02B 26/008 |
| 2019/0094523 A1* | 3/2019 | Gao | G03B 33/08 |
| 2019/0133763 A1* | 5/2019 | Jahn | A61F 2/2427 |
| 2019/0171097 A1* | 6/2019 | Fujii | G02B 26/008 |

FOREIGN PATENT DOCUMENTS

| | | |
|---|---|---|
| CN | 103912848 B | 7/2016 |
| CN | 205507347 U | 8/2016 |
| CN | 206610072 U | 11/2017 |

\* cited by examiner

ILLUMINATION SYSTEM, CONTROL UNIT THEREOF AND PROJECTION APPARATUS USING THE SAME

CROSS-REFERENCE TO RELATED APPLICATION

THIS APPLICATION CLAIMS THE PRIORITY BENEFIT OF CHINA APPLICATION (CN201810320098.7 FILED ON 2018 Apr. 11) AND CHINA APPLICATION (CN201821792210.9 FILED ON 2018 Nov. 1). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to an illumination system, and more particularly to an illumination system having two exciting light sources and a control unit for controlling the illumination system, and a projection apparatus using the illumination system.

BACKGROUND OF THE INVENTION

With the market requirements for projection brightness, color saturation, service life, non-toxic environmental protection, etc of projection apparatus, the types of light sources used in the projection apparatus are divided to UHP lamp, light emitting diode (LED) and laser diode (LD).

At present, the cost of high-brightness red laser diodes and green laser diodes is too high. In order to reduce the cost, a blue laser diode is used to excite the phosphor powder on the phosphor wheel to generate yellow light and green light. The desired red light is filtered out of the yellow light by a filter wheel. Together with the blue light emitted by the blue laser diode, the three primary colors of red, green and blue required for the projection image are generated.

The phosphor wheel is an extremely important component in the current projection apparatus using a blue laser diode as a light source. The blue light emitted by the blue laser diode is irradiated to the phosphor wheel to convert the blue laser into yellow light and green light, and the blue laser is reflected or passing through. In the known technology, the blue laser beam needs an additional optical path loop, but such a design makes the system not easy have a compact size and costly. The timing of the color light is fixed when designing the phosphor wheel and the filter wheel, and the illumination system cannot adjust the proportion of color mixing in the subsequent use.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an illumination system that can adjust the color proportion of the illumination beam and reduce the volume of the illumination system and the number of optical components.

The invention provides a control unit that increases the color proportion change of the illumination beam.

The invention provides a projection apparatus that can adjust the color proportion of the illumination beam and reduce the volume of the illumination system and the number of optical components.

Other objectives and advantages of the invention can be further understood from the technical features disclosed in the invention.

In order to achieve one or a part or all of the above objectives or other objectives, an embodiment of the invention provides an illumination system, which includes a first exciting light source, a second exciting light source and a wavelength-converting wheel. The first exciting light source is for providing a first exciting beam. The second exciting light source is for providing a second exciting beam. The wavelength-converting wheel is disposed on a transmission path of the first exciting beam and the second exciting beam. The wavelength-converting wheel has a first annular irradiation portion and a second annular irradiation portion. The first annular irradiation portion has a first light reflecting region and a first light converting region. The first light reflecting region is for reflecting the first exciting beam. The first light converting region is for converting the first exciting beam into a first converted beam and reflecting the first converted beam. The second annular irradiation portion has a second light reflecting region and a second light converting region. The second light reflecting region is for reflecting the second exciting beam. The second light converting region is for converting the second exciting beam into a second converted beam and reflecting the second converted beam.

In order to achieve one or a part or all of the above objectives or other objectives, an embodiment of the invention provides a control unit for controlling, according to a timing, switches of the first exciting light source and the second exciting light source of the aforementioned illumination system to generate color lights of different colors.

In order to achieve one or a part or all of the above objectives or other objectives, an embodiment of the invention provides a projection apparatus, which includes the aforementioned illumination system, a light valve and a projection lens. The illumination system is for providing an illumination beam. The illumination beam includes the first exciting beam, the first converted beam, the second exciting beam, and the second converted beam. The light valve is disposed on a transmission path of the illumination beam and is for converting the illumination beam into an image beam. The projection lens is disposed on a transmission path of the image beam and is for allowing the image beam to pass therethrough.

In summary, the wavelength-converting wheel in the illumination system of the embodiment of the invention has a first annular irradiation portion and a second annular irradiation portion. By respectively adjusting the proportion and the position of the first light converting region in the first annular irradiation portion and the proportion and the position of the second light converting region in the second annular irradiation portion, different color lights can be generated at different timings according to subsequent control designs on the first exciting light source and the second exciting light source when the first exciting beam is irradiated to the first annular irradiation portion and the second exciting beam is irradiated to the second annular irradiation portion, so as to change the color proportion of the light emitted by the illumination system. With the design adjustment of the wavelength-converting wheel, the control unit of the embodiment of the invention can change the switches of the first exciting light source and the second exciting light source at different timings to increase the color proportion change of the light emitted by the illumination system. Since the projection apparatus of the embodiment of the invention uses the illumination system described above, the color proportion of the exiting light can be adjusted.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
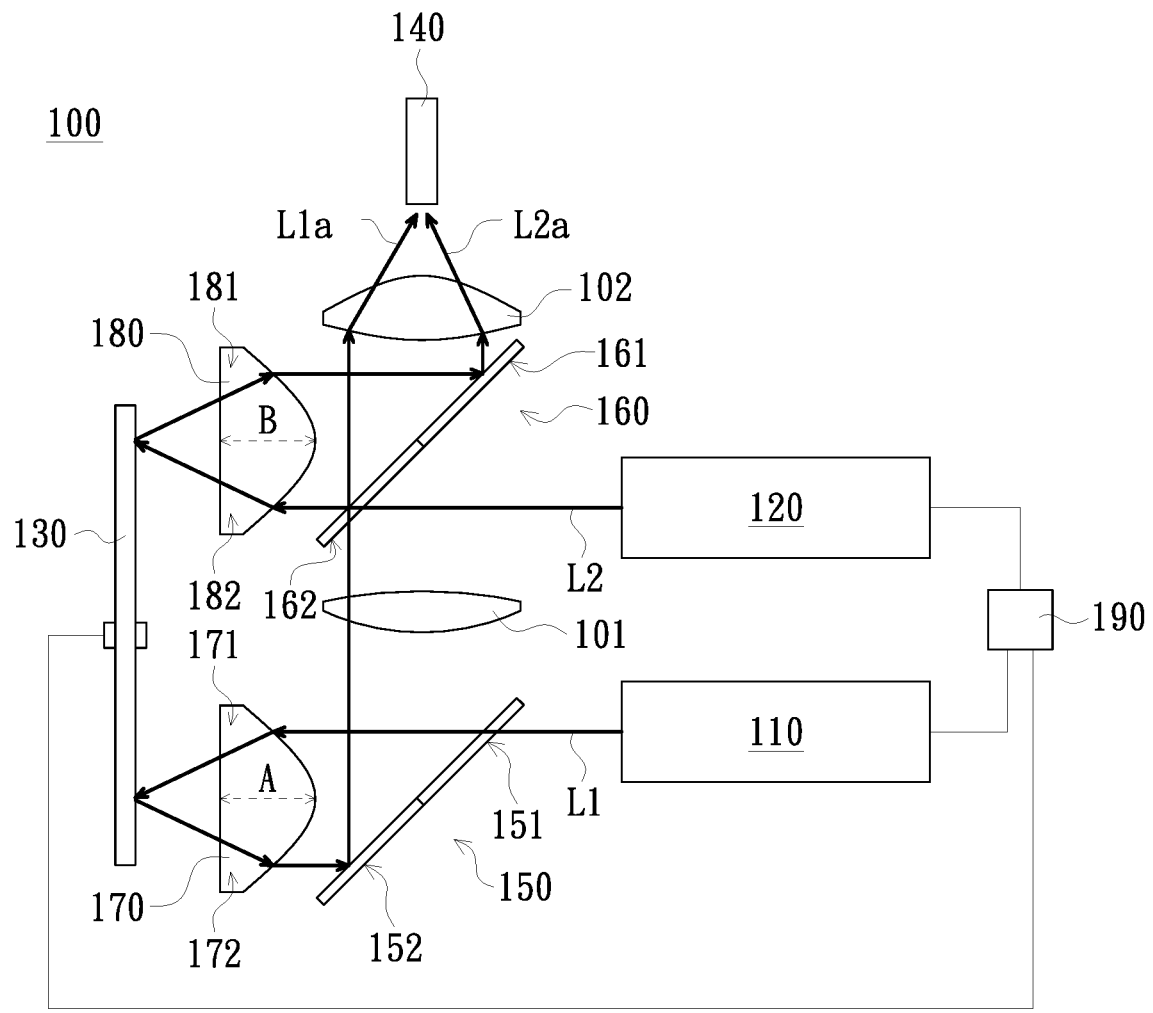
FIGS. 1A and 1B are schematic views of optical paths of an illumination system at different timings according to an embodiment of the invention.
Figure 1B:
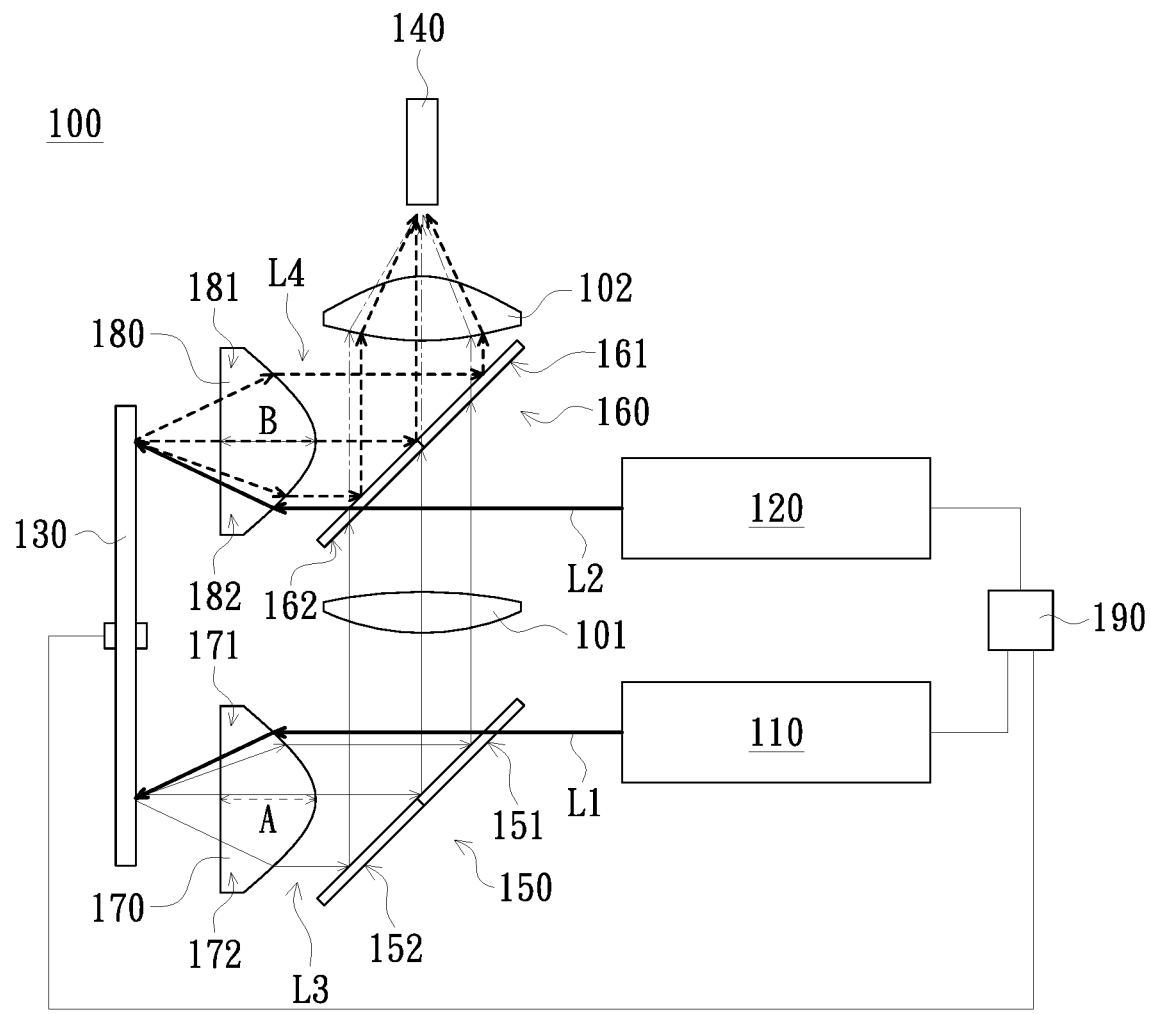
Figure 1C:
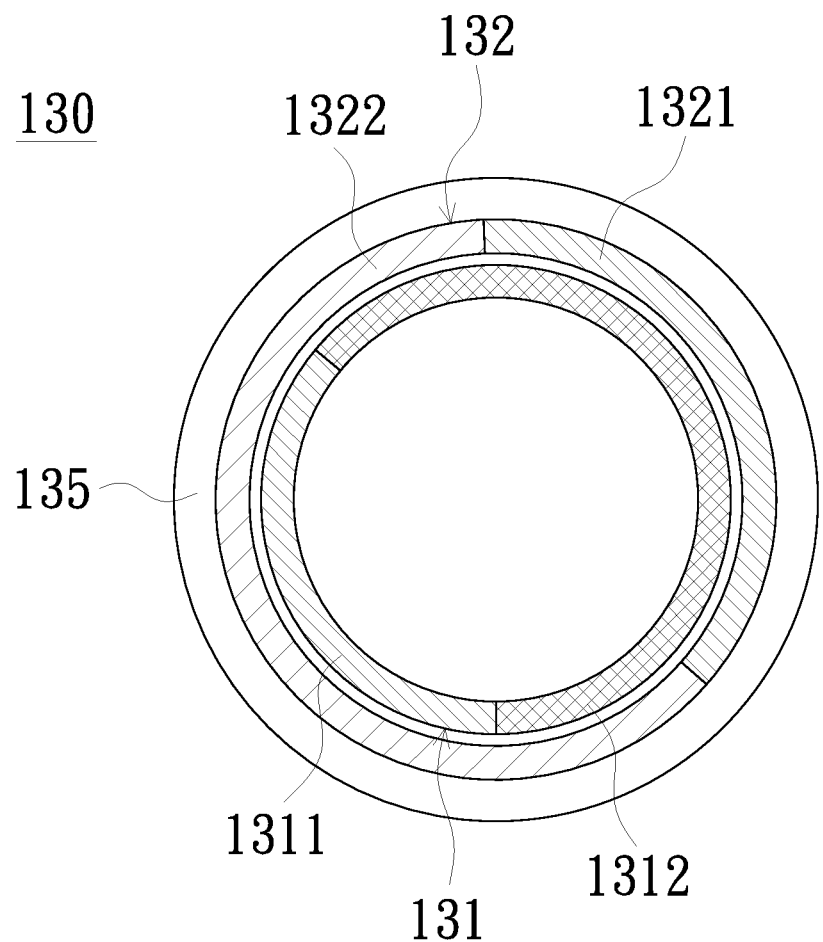
FIG. 1C is a schematic view of a wavelength-converting wheel according to an embodiment of the invention.

FIGS. 1A and 1B are schematic views of optical paths of an illumination system at different timings according to an embodiment of the invention. FIG. 1C is a schematic view of a wavelength-converting wheel according to an embodiment of the invention. Referring first to FIGS. 1A and 1C, the illumination system 100 of the embodiment includes a first exciting light source 110, a second exciting light source 120 and a wavelength-converting wheel 130. The first exciting light source 110 is for providing a first exciting beam L1. The second exciting light source 120 is for providing a second exciting beam L2. The first exciting light source 110 and the second exciting light source 120 are, for example, laser light sources or other solid state light sources, but are not limited thereto. The wavelength-converting wheel 130 is disposed on the transmission path of the first exciting beam L1 and the second exciting beam L2. The material of the wheel 135 of the wavelength-converting wheel 130 is, for example, metal or glass, and the surface of the glass may be plated with aluminum, silver or a dielectric plating film. The wheel 135 is for reflecting beams, but is not limited thereto. The wavelength-converting wheel 130 has a first annular irradiation portion 131 and a second annular irradiation portion 132 disposed on the wheel 135. The first annular irradiation portion 131 surrounds the second annular irradiation portion 132 for example, or the second annular irradiation portion 132 surrounds the first annular irradiation portion 131 for example. The embodiment is exemplified by that the second annular irradiation portion 132 surrounds the first annular irradiation portion 131, that is, the radius of the second annular irradiation portion 132 is greater than the radius of the first annular irradiation portion 131, and the first annular irradiation portion 131 is disposed inside the second annular irradiation portion 132. The first annular irradiation portion 131 has a first light reflecting region 1311 and a first light converting region 1312. The second annular irradiation portion 132 has a second light reflecting region 1321 and a second light converting region 1322. Referring to FIGS. 1A and 1C, at timing, the first exciting beam L1 is irradiated to the first light reflecting region 1311, and the first light reflecting region 1311 is for reflecting the first portion L1a of the first exciting beam L1; and the second exciting beam L2 is irradiated to the second light reflecting region 1321, and the second light reflecting region 1321 is for reflecting the first portion L2a of the second exciting beam L2. Referring to FIGS. 1B and 1C, at another different timing, the first exciting beam L1 is irradiated to the first light converting region 1312, and the first light converting region 1312 is for converting the second portion of the first exciting beam L1 into a first converted beam L3 and reflecting the first converted beam L3; and the second exciting beam L2 is irradiated to the second light converting region 1322, and the second light converting region 1322 is for converting the second portion of the second exciting beam L2 into a second converted beam L4 and reflecting the second converted beam L4. The first annular irradiation portion 131 and the second annular irradiation portion 132 of the embodiment are exemplified by that each have one light converting region (the first light converting region 1312 and the second light converting region 1322). In other embodiments, at least one of the annular irradiation portion 131 and the second annular irradiation portion 132 may also have a plurality of light converting regions. Each light converting region is provided with, for example, a wavelength-converting material, such as a phosphor powder, a quantum dot film, or the like, and is not limited thereto. In the same annular irradiation portion, the color of the converted beam converted by the wavelength converting material in the different light converting region is different.

A person having ordinary skill in the art knows that the wavelength-converting wheel 130 is driven by a motor (not shown) to rotate. According to the rotation of the wheel 135, the first exciting beam L1 irradiates to the first light reflecting region 1311 and the first light converting region 1312 in turn. The first portion L1a of the first exciting beam L1 means the first exciting beam L1 irradiating the first light reflecting region 1311. The second portion of the first exciting beam L1 means the first exciting beam L1 irradiating the first light converting region 1312. More specifically, in the embodiment, when the first light reflecting region 1311 is rotated to the transmission path of the first exciting beam L1, in this moment, the exciting beam L1a irradiating the first light reflecting region 1311 as the first portion of the first exciting beam L1. The first portion of the first exciting beam L1 is reflected by the first light reflecting region 1311.

On the other hand, in the embodiment, when first light converting region 1312 is rotated to the transmission path of the first exciting beam L1, in this moment, the first exciting beam L1 irradiating the first light converting region 1312 as the second portion of the first exciting beam L1. The second portion of the first exciting beam L1 is converted into the first converted beam L3 by the first light converting region 1312.

In this specification of the invention, the first portion of the first exciting beam and the second portion of the first exciting beam do not mean the first exciting beam including two kinds of beams or two beams. It means that the same exciting beam emitted from the first exciting light source 110 irradiates the wavelength-converting wheel 130 in different period respectively. For example, the same exciting beam emitted from the first exciting light source 110 irradiates the first light reflecting region 1311 and the first light converting region 1312. For convenience, the exciting beam irradiating the first light reflecting region 1311 and the first light converting region 1312 of the first annular irradiation portion 131 in different periods represents as the first portion of the first exciting beam and the second portion of the first exciting beam. Briefly, the first portion (L1*a*) of the first exciting beam L1 represents the exciting beam irradiating the first light reflecting region 1311. When the first light converting region 1312 rotates to the transmission path of the first exciting beam L1, the first exciting beam L1 irradiates the first light converting region 1312 and the first exciting beam L1 is converted into the first converted beam L3 by the first light converting region 1312. Therefore, the second portion of the first exciting beam L1 represents the exciting beam irradiating the first light converting region 1312. In the same reason, according to the rotation of the wheel 135, the second exciting beam L2 irradiates the second light reflecting region 1321 and the second light converting region 1322 of the second annular irradiation portion 132. Abovementioned the first portion (L2*a*) of the second exciting beam L2 represents the exciting beam irradiating the second light reflecting region 1321. The second portion of the second exciting beam L2 represents the exciting beam irradiating the second light converting region 1322.

More specifically, in the embodiment, when the second light reflecting region 1321 is rotated to the transmission path of the second exciting beam L2, in this moment, the exciting beam L2*a* irradiating the second light reflecting region 1321 as the first portion of the second exciting beam L2. The first portion of the second exciting beam L2 is reflected by the second light reflecting region 1321.

On the other hand, in the embodiment, when second light converting region 1322 is rotated to the transmission path of the second exciting beam L2, in this moment, the second exciting beam L2 irradiating the second light converting region 1322 as the second portion of the second exciting beam L2. The second portion of the second exciting beam L1 is converted into the second converted beam L4 by the second light converting region 1322.

In this specification of the invention, the first portion of the second exciting beam and the second portion of the second exciting beam do not mean the second exciting beam including two kinds of beams or two beams. It means that the same exciting beam emitted from the second exciting light source 120 irradiates the wavelength-converting wheel 130 in different period respectively. For example, the same exciting beam emitted from the second exciting light source 120 irradiates the second light reflecting region 1321 and the second light converting region 1322. For convenience, the exciting beam irradiating the second light reflecting region 1321 and the second light converting region 1322 of the second annular irradiation portion 132 in different periods represents as the first portion of the second exciting beam and the second portion of the second exciting beam. Briefly, the first portion (L2*a*) of the second exciting beam L2 represents the exciting beam irradiating the second light reflecting region 1321. When the second light converting region 1322 rotates to the transmission path of the second exciting beam L2, the second exciting beam L2 irradiates the second light converting region 1322 and the second exciting beam L2 is converted into the second converted beam L4 by the second light converting region 1322. Therefore, the second portion of the second exciting beam L2 represents the exciting beam irradiating the second light converting region 1322.

The illumination system 100 further includes, for example, a light homogenizing element 140, a first beam splitter and combiner element 150 and a second beam splitter and combiner element 160. The light homogenizing element 140 is disposed on the transmission path of the first portion L1*a* of the first exciting beam L1, the first portion L2*a* of the second exciting beam L2, the first converted beam L3 and the second converted beam L4. The light homogenizing element 140 is, for example, a light integration rod, but is not limited thereto. The light integration rod may be a solid cylinder, a hollow cylinder or a lens array. In the transmission path of the first exciting beam L1, the first beam splitter and combiner element 150 is disposed between the first exciting light source 110 and the wavelength-converting wheel 130, and is for guiding the first exciting beam L1 from the first exciting light source 110 to the wavelength-converting wheel 130 and guiding the first portion L1*a* of the first exciting beam L1 and the first converted beam L3 to the light homogenizing element 140. In the transmission path of the second exciting beam L2, the second beam splitter and combiner element 160 is disposed between the second exciting light source 120 and the wavelength-converting wheel 130, and the second beam splitter and combiner element 160 is for guiding the second exciting beam L2 to the wavelength-converting wheel 130 and guiding the first portion L2*a* of the second exciting beam L2 and the second converted beam L4 to the light homogenizing element 140. The first beam splitter and combiner element 150 and the second beam splitter and combiner element 160 are, for example, dichroic elements, such as a dichroic mirror or a prism coated with a dichroic coating in the middle. In the embodiment, the second beam splitter and combiner element 160 is, for example, disposed between the first beam splitter and combiner element 150 and the light homogenizing element 140 in a direction, wherein the direction is defined as the arrangement direction of the first exciting light source 110 and the second exciting light source 120.

The illumination system 100 may further include a plurality of lenses or other optical components, such as lenses 101 and 102. The lens 101 is disposed between the first beam splitter and combiner element 150 and the second beam splitter and combiner element 160. The lens 102 is disposed between the second beam splitter and combiner element 160 and the light homogenizing element 140.

The illumination system 100 further includes, for example, a first light condenser element 170 and a second light condenser element 180. The first light condenser element 170 is disposed between the wavelength-converting wheel 130 and the first beam splitter and combiner element 150, and is for deflecting the first exciting beam L1 to the first annular irradiation portion 131. The second light condenser element 180 is disposed between the wavelength-converting wheel 130 and the second beam splitter and combiner element 160, and is for deflecting the second exciting beam L2 to the second annular irradiation portion 132. The first light condenser element 170 and the second light condenser element 180 respectively include, for example, at least one collimating lens, but are not limited thereto. The first light condenser element 170 has a first optical axis A, a first partial part 171 and a second partial part 172, wherein the first partial part 171 and the second partial part 172 are respectively located on the two sides of the first optical axis A. The second light condenser element 180 has a second optical axis B, a third partial part 181 and a fourth partial part 182, wherein the third partial part 181 and the fourth partial part 182 are respectively located on the two sides of the second optical axis B. The first partial part 171 and the fourth partial part 182 are located, for example, between the first optical axis A and the second optical axis B. The optical axis of the first exciting light source 110 is, for example, non-coaxial with the optical axis A of the first light condenser element 170, so that the first light condenser element 170 can deflect the first exciting beam L1. The optical axis of the second exciting light source 120 is, for example, non-coaxial with the optical axis B of the second light condenser element 180, so that the second light condenser element 180 can deflect the second exciting beam L2.

The first beam splitter and combiner element 150 includes a first dichroic portion 151 and a second dichroic portion 152. The first exciting light source 110 and the first dichroic portion 151 correspond to the first partial part 171, so that the first exciting beam L1 provided by the first exciting light source 110 passes through the first dichroic portion 151 and is transmitted to the first partial part 171 and is deflected by the first partial part 171 to the first annular irradiation portion 131. The first dichroic portion 151 is for reflecting the first converted beam L3. The second dichroic portion 152 is for reflecting the first portion L1a of the first exciting beam L1 and the first converted beam L3. The second beam splitter and combiner element 160 has a third dichroic portion 161 and a fourth dichroic portion 162. The third dichroic portion 161 is for reflecting the first portion L2a of the second exciting beam L2 and the second converted beam L4, and allowing a partial wavelength band of the first converted beam L3 to pass therethrough. The second exciting light source 120 and the fourth dichroic portion 162 correspond to the fourth partial part 182, so that the second exciting beam L2 provided by the second exciting light source 120 passes through the fourth dichroic portion 162 and is transmitted to the fourth partial part 182 and is deflected by the four portion 182 to the second annular irradiation portion 132. The fourth dichroic portion 162 is for allowing the first portion L1a of the first exciting beam L1 and a partial wavelength band of the first converted beam L3 to pass therethrough and reflecting the second converted beam L4. Hereinafter, the principle of penetration of the first beam splitter and combiner element 150 and the second beam splitter and combiner element 160 will be exemplified by color light, but is not limited thereto.

Figure 2A:
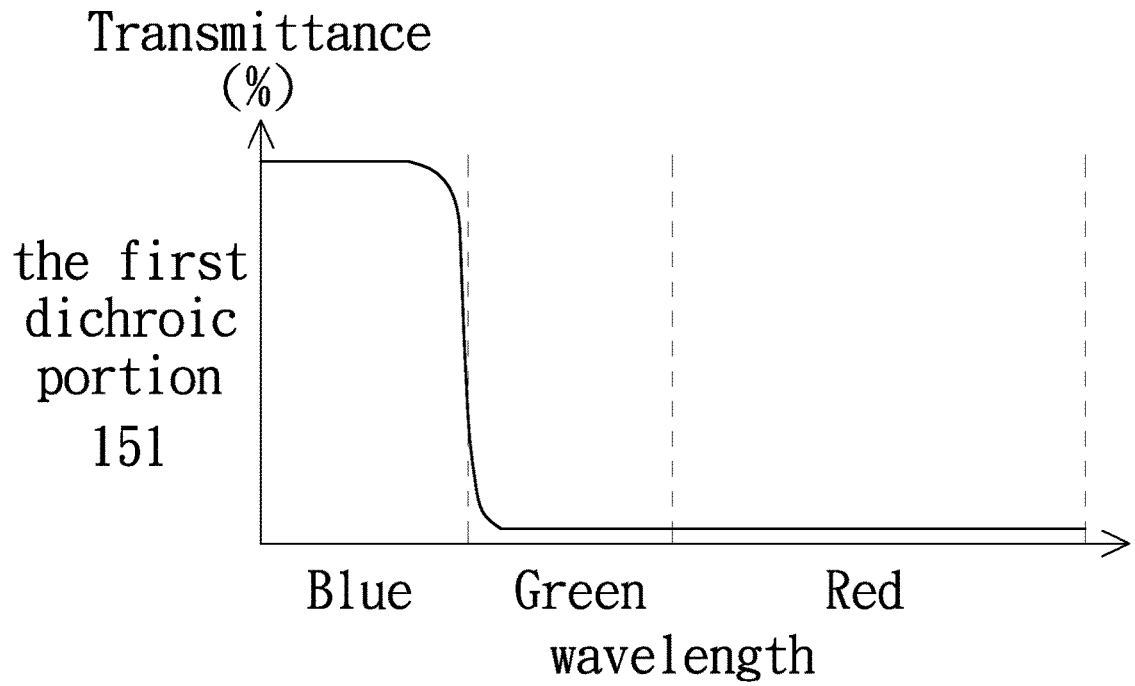
FIG. 2A is a schematic diagram showing the relationship between the transmittance and the wavelength of a first dichroic portion of a first beam splitter and combiner element according to an embodiment of the invention.
Figure 2B:
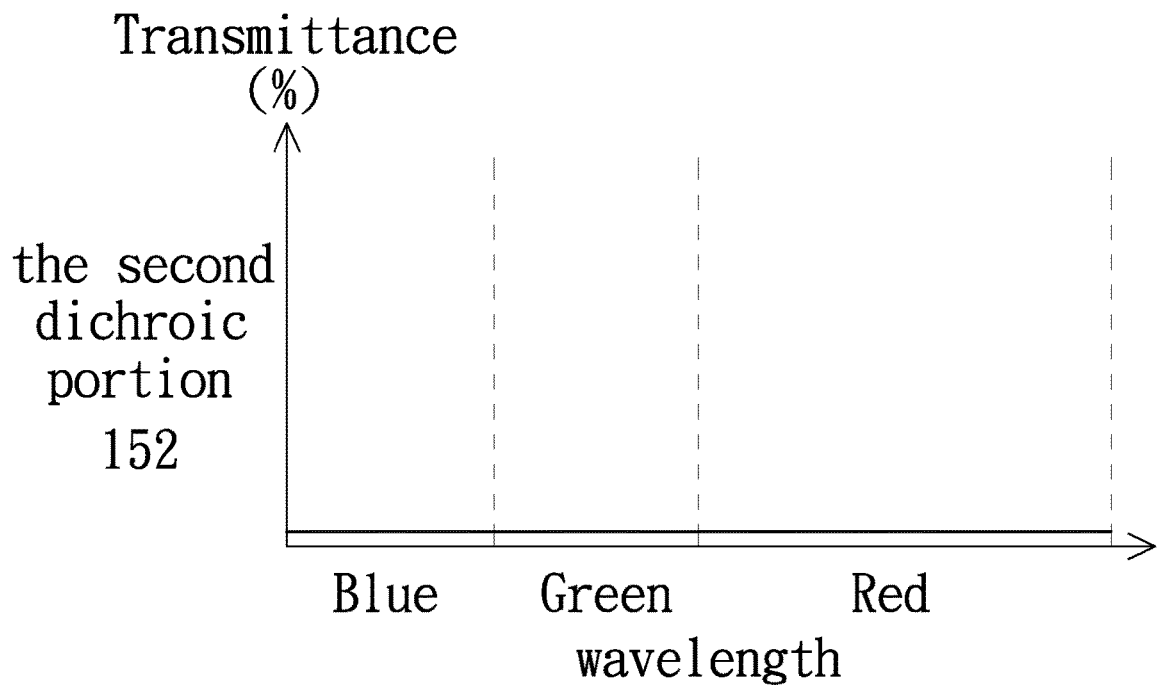
FIG. 2B is a schematic diagram showing the relationship between the transmittance and the wavelength of a second dichroic portion of a first beam splitter and combiner element according to an embodiment of the invention.
Figure 2C:
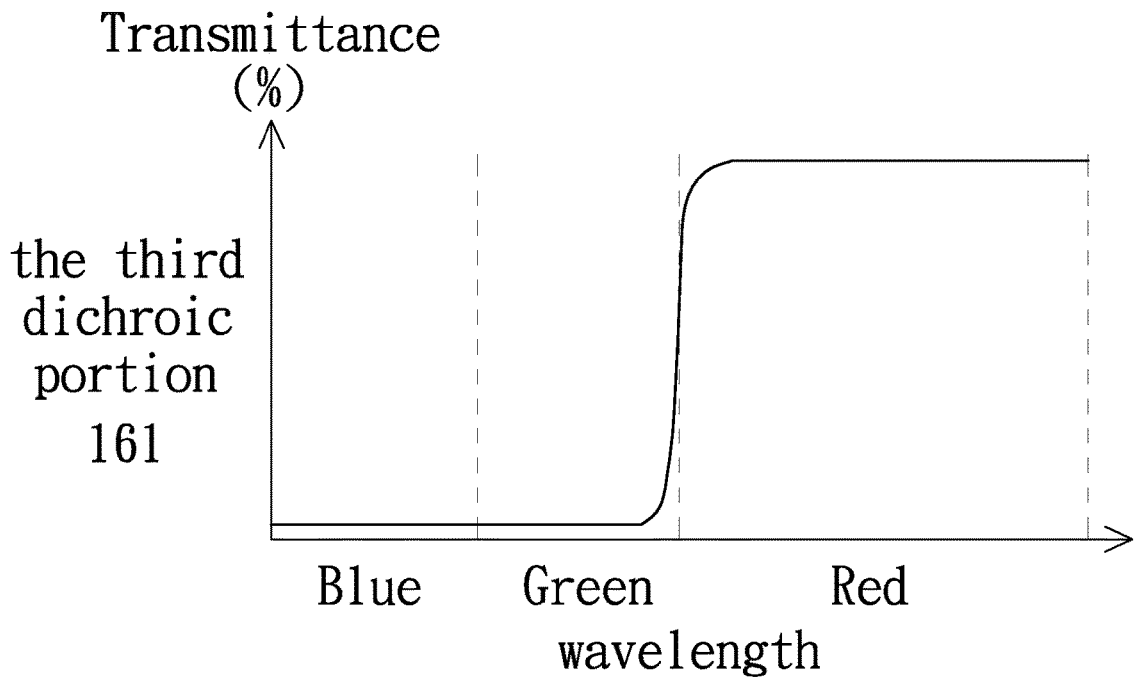
FIG. 2C is a schematic diagram showing the relationship between the transmittance and the wavelength of a third dichroic portion of a second beam splitter and combiner element according to an embodiment of the invention.
Figure 2D:
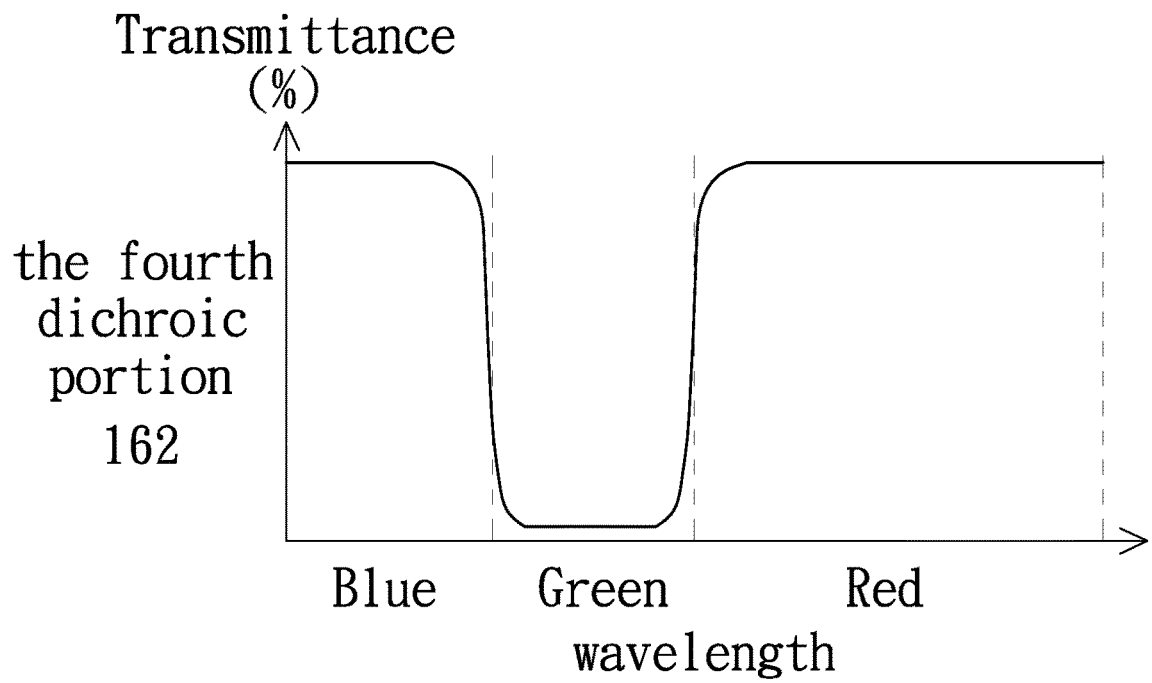
FIG. 2D is a schematic diagram showing the relationship between the transmittance and the wavelength of a fourth dichroic portion of a second beam splitter and combiner element according to an embodiment of the invention.

FIG. 2A is a schematic diagram showing the relationship between the transmittance and the wavelength of a first dichroic portion of a first beam splitter and combiner element according to an embodiment of the invention. FIG. 2B is a schematic diagram showing the relationship between the transmittance and the wavelength of a second dichroic portion of a first beam splitter and combiner element according to an embodiment of the invention. FIG. 2C is a schematic diagram showing the relationship between the transmittance and the wavelength of a third dichroic portion of a second beam splitter and combiner element according to an embodiment of the invention. FIG. 2D is a schematic diagram showing the relationship between the transmittance and the wavelength of a fourth dichroic portion of a second beam splitter and combiner element according to an embodiment of the invention. Referring to FIGS. 2A to 2D, the wavelength-converting wheel 130 of the embodiment is, for example, a phosphor wheel. The first exciting beam L1 is, for example, blue light, and the first light converting region 1312 is coated, for example, with a phosphor powder that generates yellow light or a phosphor powder that generates red light (hereinafter referred to as a yellow phosphor powder or a red phosphor powder), so that the first converted beam L3 is yellow light or red light. The second exciting beam L2 is, for example, blue light, and the second light converting region 1322 is coated, for example, with a phosphor powder that generates green light (hereinafter referred to as a green phosphor), so that the second converted beam L4 is green light. The first dichroic portion 151 is for allowing blue light to pass therethrough and reflecting green light and red light. The second dichroic portion 152 is for reflecting blue light, green light and red light. In an embodiment, the second dichroic portion 152 may be a reflective layer. The third color separating 161 is for allowing red light to pass therethrough and reflecting blue light and green light. The fourth dichroic portion 162 is for allowing blue light and red light to pass therethrough and reflecting green light. When the first converted beam L3 is yellow light and is transmitted to the third dichroic portion 161 and the fourth dichroic portion 162, a partial wavelength band of the green light of the first converted light beam L3 is reflected, and only a partial wavelength band of the red light can pass therethrough, so that it is red light when incident on the light homogenizing element 140. In addition, the first exciting beam L1 and the second exciting beam L2 may be blue light of different wavelengths, wherein the blue light wavelength is, for example, 445 nm or 455 nm.

Figure 3:
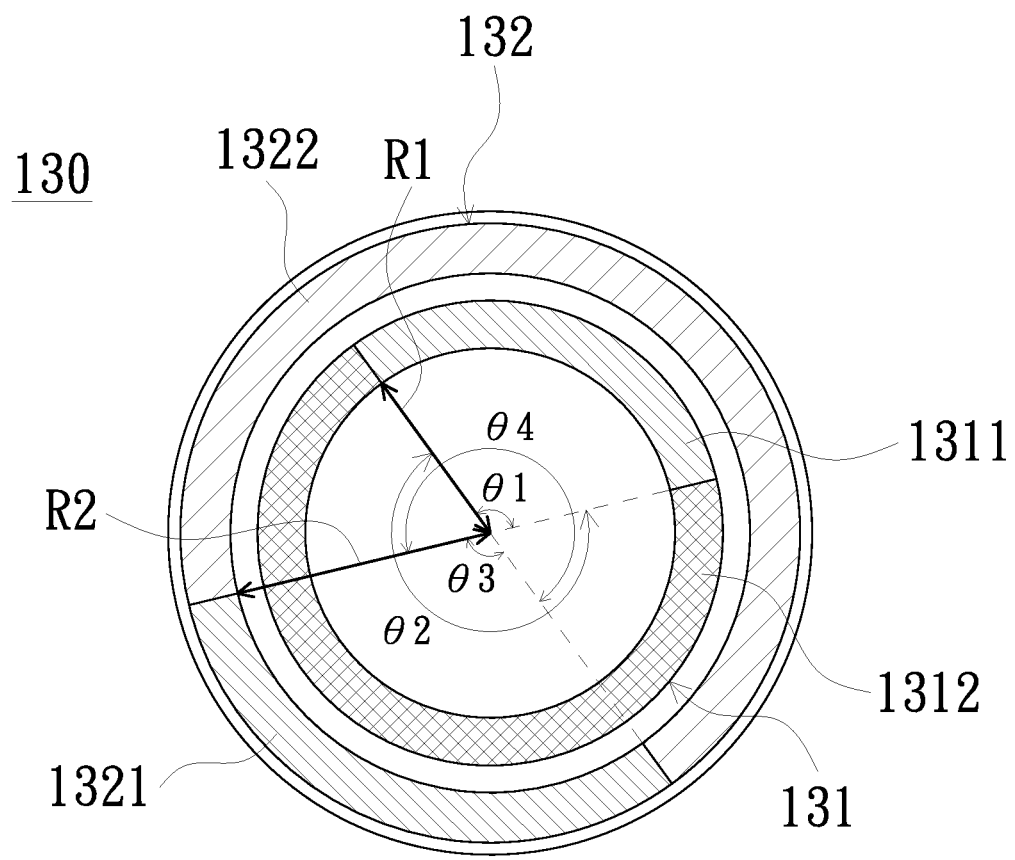
FIG. 3 is a schematic view of a wavelength-converting wheel according to an embodiment of the invention.

FIG. 3 is a schematic view of a wavelength-converting wheel according to an embodiment of the invention. Referring to FIG. 3, the first light reflecting region 1311 of the wavelength-converting wheel 130 of the embodiment is disposed along the first radius R1 along the first arc and has a first central angle $\theta 1$. The first light converting region 1312 is disposed along the first radius R1 along the second arc and has a second central angle $\theta 2$. The second light reflecting region 1321 is disposed along the second radius R2 along the third arc and has a third central angle $\theta 3$. The second light converting region 1322 is disposed along the second radius R2 along the fourth arc and has a fourth central angle $\theta 4$. The first central angle $\theta 1$ is, for example, less than the fourth central angle $\theta 4$, the third central angle $\theta 3$ is, for example, less than the second central angle $\theta 2$, and the angles of the first central angle $\theta 1$ and the third central angle $\theta 3$ are, for example, between 50° and 90°, but are not limited thereto.

Hereinafter, how the illumination system 100 produces color lights of different colors at different timings will be described.

The control unit 190 (shown in FIGS. 1A and 1B) of an embodiment of the invention can be used to control the switches of the first exciting light source 110 and the second exciting light source 120 of the illumination system 100 according to timings to generate color lights of different colors. The control unit 190 is, for example, a central processing unit (CPU), or other programmable microprocessor for general purpose or special purpose, a digital signal processor (DSP), a programmable controller, an application specific integrated circuit (ASIC), a programmable logic devices (PLD), or other similar devices or a combination of these devices. The control unit 190 is electrically connected to the first exciting light source 110 and the second exciting light source 120 to control the switches of the first exciting light source 110 and the second exciting light source 120. The first exciting beam L1 is, for example, blue light, and the first light converting region 1312 is coated, for example, with a yellow phosphor powder or a red phosphor powder, so that the first converted beam L3 is yellow light or red light. The second exciting beam L2 is, for example, blue light, and the second light converting region 1322 is coated, for example, with a green phosphor powder, so that the second converted beam L4 is green light. The following embodiments of the timings and color lights of different illumination systems are exemplified by the above conditions, and no redundant detail is to be given herein, but the invention is not limited thereto.

Figure 4A:
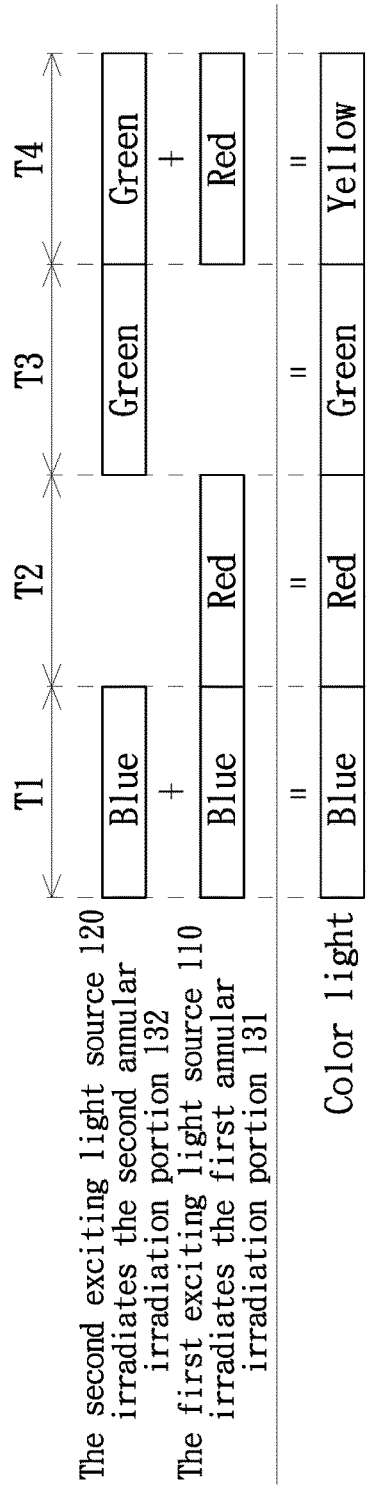
FIG. 4A is a schematic view showing the relationship between timing and color light of an illumination system according to an embodiment of the invention.

FIG. 4A is a schematic view showing the relationship between timing and color light of an illumination system according to an embodiment of the invention. Referring to FIG. 4A, the control unit 190 of the embodiment controls the switches of the first exciting light source 110 and the second exciting light source 120 by using, for example, four timings as one cycle. The control unit 190 turns on the first exciting light source 110 and the second exciting light source 120 at the first timing T1, so that the first exciting beam L1 is irradiated to the first light reflecting region 1311, the second exciting beam L2 is irradiated to the second light reflecting region 1321, and therefore the illumination system 100 generates blue light. The control unit 190 turns on the first exciting light source 110 and turns off the second exciting light source 120 at the second timing T2, so that the first exciting beam L1 is irradiated to the first light converting region 1312 to generate the first converted beam L3, and therefore the illumination system 100 generates red light. The control unit 190 turns off the first exciting light source 110 and turns on the second exciting light source 120 at the third timing T3, so that the second exciting beam L2 is irradiated to the second light converting region 1322 to generate the second converted beam L4, and therefore the illumination system 100 generates green light. The control unit 190 turns on the first exciting light source 110 and the second exciting light source 120 at the fourth timing T4, so that the first exciting beam L1 is irradiated to the first light converting region 1312 to generate the first converted beam L3, the second exciting beam L2 is irradiated to the second light converting region 1322 to generate the second converted beam L4, and therefore the illumination system 100 generates yellow light (red light plus green light).

In the first timing T1, the first central angle θ1 and the third central angle θ3 on the wavelength-converting wheel 130 can be increased by design requirements, so as to enlarge the time for generating blue light. In addition, the control unit 190 can arbitrarily adjust the time lengths of the second timing T2, the third timing T3 and the fourth timing T4 by controlling the time of switching the first exciting light source 110 and the second exciting light source 120, that is, changing the time proportion of the generation of color light.

The wavelength-converting wheel 130 in the illumination system 100 of the embodiment has the first annular irradiation portion 131 and the second annular irradiation portion 132. By respectively adjusting the proportion and the position of the first light converting region 1312 in the first annular irradiation portion 131 and the proportion and the position of the second light converting region 1322 in the second annular irradiation portion 132, different color lights can be generated at different timings according to subsequent control designs on the first exciting light source 110 and the second exciting light source 120 when the first exciting beam L1 is irradiated to the first annular irradiation portion 131 and the second exciting beam L2 is irradiated to the second annular irradiation portion 132, so as to change the color proportion of the light emitted by the illumination system 100. The control unit 190 of the embodiment can change the switches of the first exciting light source 110 and the second exciting light source 120 at different timings to increase the color proportion change of the light emitted by the illumination system 100.

Figure 4B:
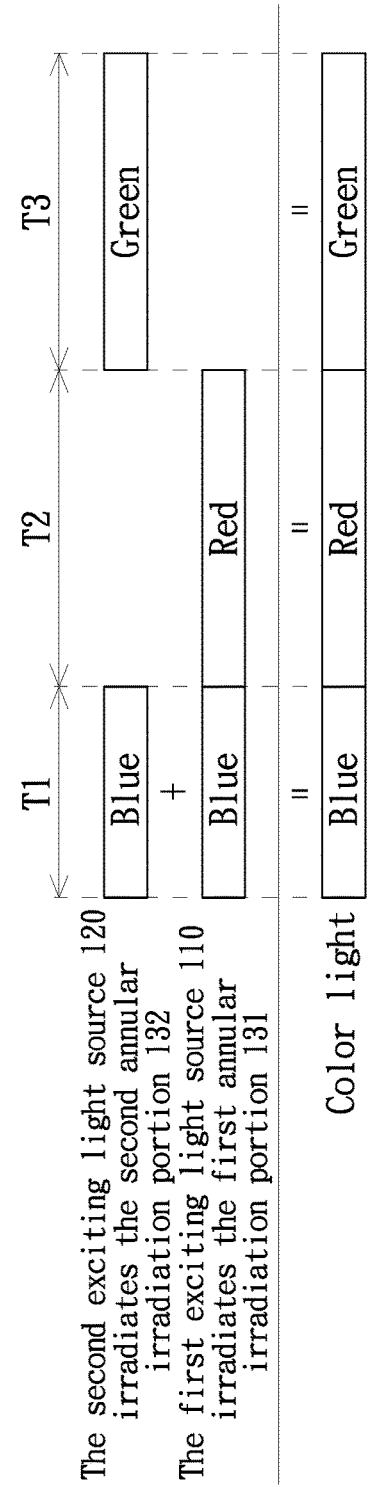
FIG. 4B is a schematic view showing the relationship between timing and color light of an illumination system according to another embodiment of the invention.

According to the function of the control unit 190 described above, the time length of different timings can be arbitrarily adjusted, such as only having the first timing T1, the second timing T2 and the third timing T3. FIG. 4B is a schematic view showing the relationship between timing and color light of an illumination system according to another embodiment of the invention. Referring to FIG. 4B, the control unit 190 of the embodiment controls the switches of the first exciting light source 110 and the second exciting light source 120 by using, for example, three timings as one cycle. The control unit 190 turns on the first exciting light source 110 and the second exciting light source 120 at the first timing T1, so that the first exciting beam L1 is irradiated to the first light reflecting region 1311, the second exciting beam L2 is irradiated to the second light reflecting region 1321, and therefore the illumination system 100 generates blue light. The control unit 190 turns on the first exciting light source 110 and turns off the second exciting light source 120 at the second timing T2, so that the first exciting beam L1 is irradiated to the first light converting region 1312 to generate the first converted beam L3, and therefore the illumination system 100 generates red light. The control unit 190 turns off the first exciting light source 110 and turns on the second exciting light source 120 at the third timing T3, so that the second exciting beam L2 is irradiated to the second light converting region 1322 to generate the second converted beam L4, and therefore the illumination system 100 generates green light.

Figure 4C:
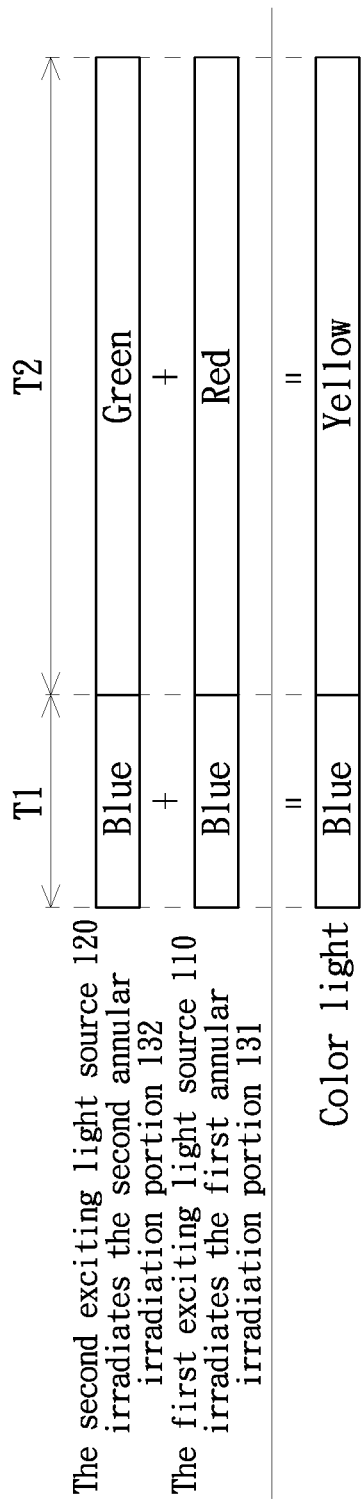
FIG. 4C is a schematic view showing the relationship between timing and color light of an illumination system according to another embodiment of the invention.

FIG. 4C is a schematic view showing the relationship between timing and color light of an illumination system according to another embodiment of the invention. Referring to FIG. 4C, the control unit 190 of the embodiment controls the switches of the first exciting light source 110 and the second exciting light source 120 by using, for example, two timings as one cycle. The control unit 190 turns on the first exciting light source 110 and the second exciting light source 120 at the first timing T1, so that the first exciting beam L1 is irradiated to the first light reflecting region 1311, the second exciting beam L2 is irradiated to the second light reflecting region 1321, and therefore the illumination system 100 generates blue light. The control unit 190 turns on the first exciting light source 110 and the second exciting light source 120 at the second timing T2, so that the first exciting beam L1 is irradiated to the first light converting region 1312 to generate the first converted beam L3, the second exciting beam L2 is irradiated to the second light converting region 1322 to generate the second converted beam L4, and therefore the illumination system 100 generates yellow light (red light plus green light).

Figure 5A:
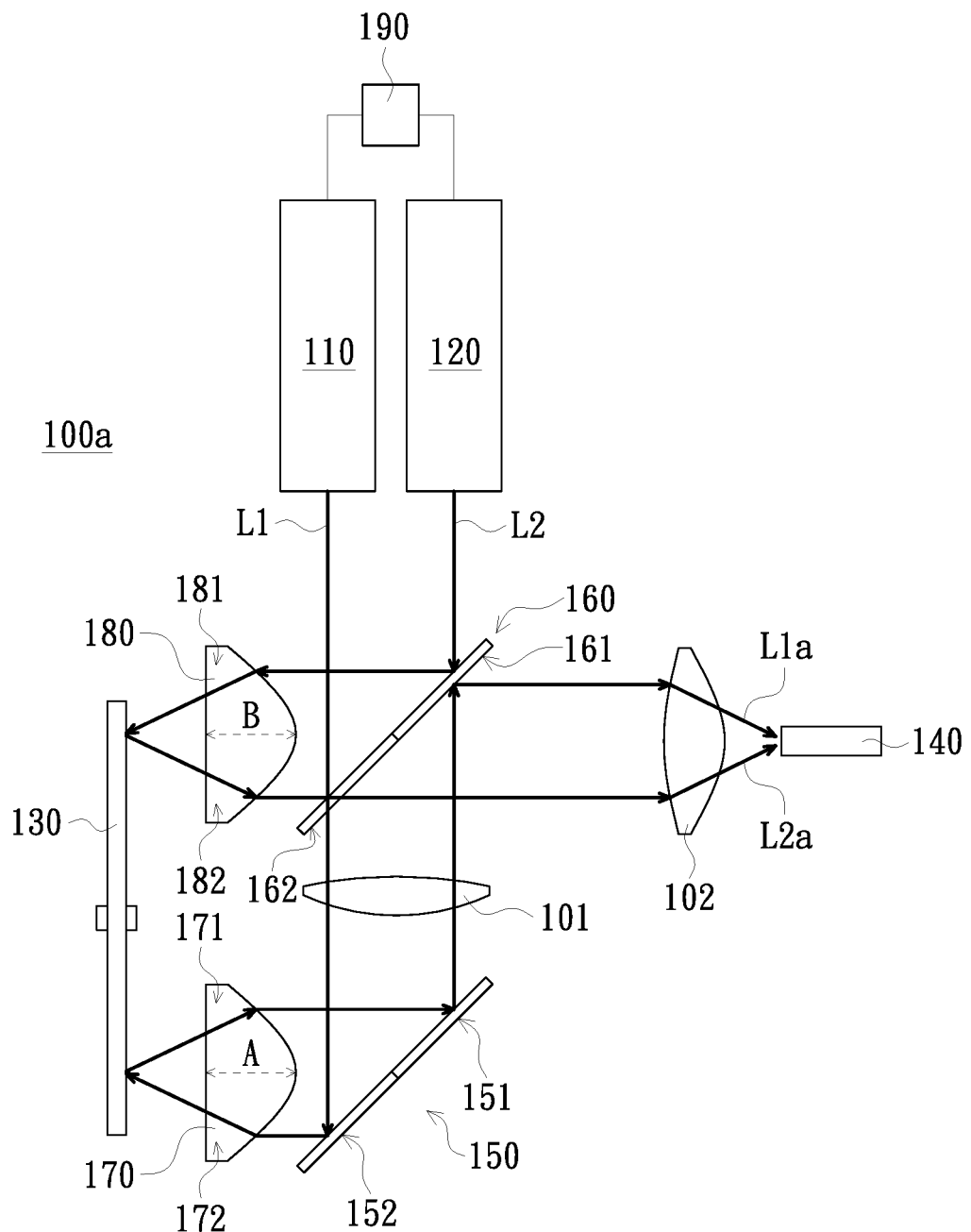
FIGS. 5A and 5B are schematic views of optical paths of an illumination system at different timings according to another embodiment of the invention.
Figure 5B:
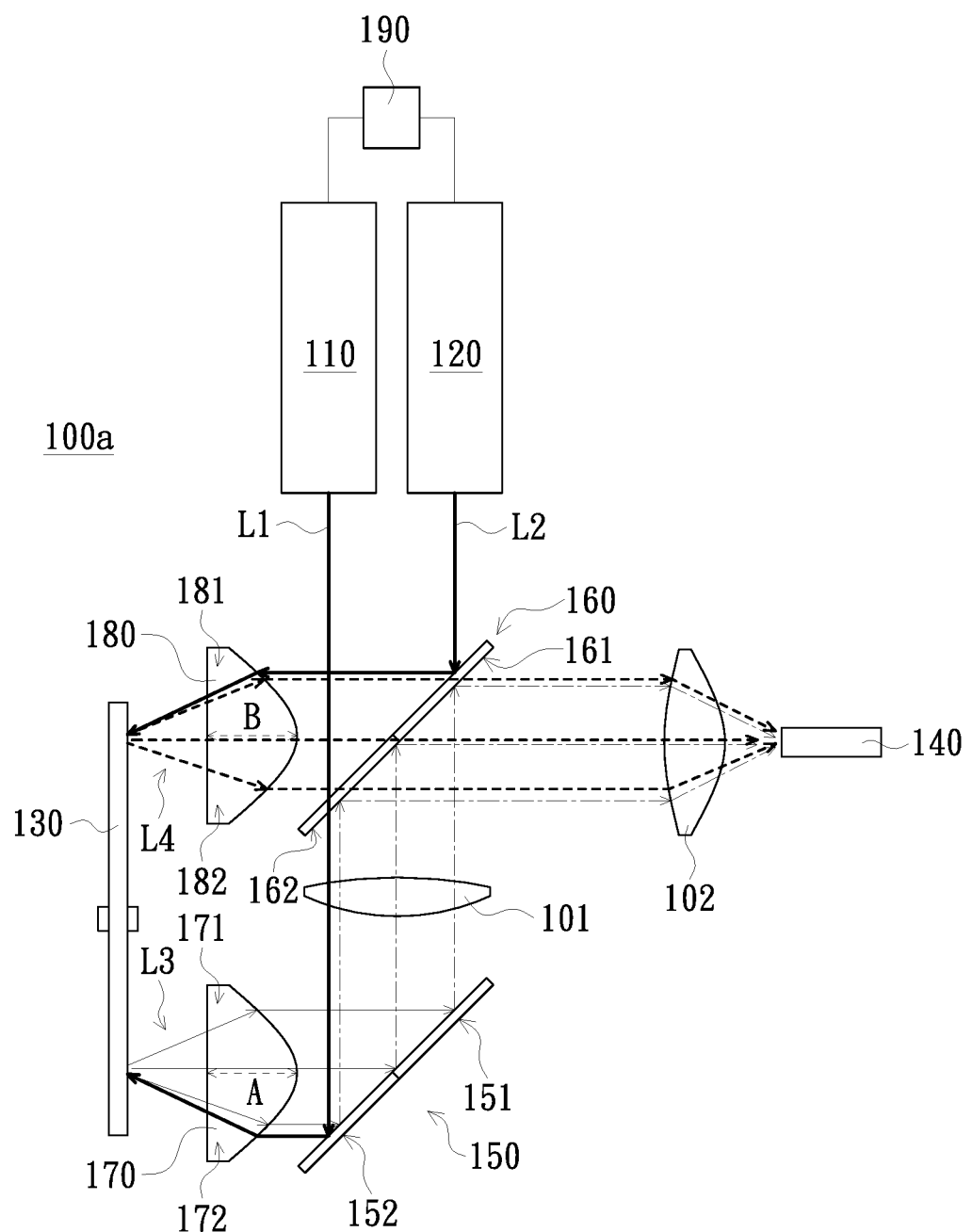

FIGS. 5A and 5B are schematic views of optical paths of an illumination system at different timings according to another embodiment of the invention. Referring to FIGS. 5A, 5B and 1C, the illumination system 100a of the embodiment is similar to the illumination system 100 in structure and advantages, and only the main differences in structure will be described below. In the illumination system 100a of the embodiment, the second beam splitter and combiner element 160 is disposed between the first beam splitter and combiner element 150 and the first exciting light source 110 as well as the second exciting light source 120, and the first exciting light source 110 and the second excitation light source 120 are located on the same side of the second beam splitter and combiner element 160. The first exciting light source 110 and the second dichroic portion 152 of the first beam splitter and combiner element 150 correspond to the second partial part 172 of the first light condenser element 170, so that the first exciting beam L1 provided by the first exciting light source 110 is reflected by the second dichroic portion 152 and is transmitted to the second partial part 172 and is deflected by the second partial part 172 to the first annular irradiation portion 131. The first dichroic portion 151 is for reflecting the first portion L1*a* of the first exciting beam L1. The first dichroic portion 151 and the second dichroic portion 152 are for reflecting a partial wavelength band of the first converted beam L3 to the second beam splitter and combiner element 160, and then the partial wavelength band of the first converted beam L3 is reflected to the light homogenizing element 140. In an embodiment, the first dichroic portion 151 and the second dichroic portion 152 may be reflective layers. The first portion L2*a* of the second exciting beam L2 and the second converted beam L4 are for passing through the fourth dichroic portion 162 of the second beam splitter and combiner element 160. The second exciting light source 120 and the third dichroic portion 161 correspond to the third partial part 181 of the second light condenser element 180, so that the second exciting beam L2 provided by the second exciting light source 120 is reflected by the third dichroic portion 161 and is transmitted to the third partial part 181 and is deflected by the third partial part 181 to the second annular irradiation portion 132. The third dichroic portion 161 is for reflecting the first portion L1*a* of the first exciting beam L1 and allowing the second converted beam L4 to pass therethrough. The method of generating the color lights of different colors at different timings described above is also applicable to the illumination system 100*a*. Since the function of the control unit 190 is the same as that of the above embodiment, no redundant detail is to be given herein.

The illumination system 100*a* may further include a plurality of lenses or other optical components, such as lenses 101 and 102. The lens 101 is disposed between the first beam splitter and combiner element 150 and the second beam splitter and combiner element 160. The lens 102 is disposed between the second beam splitter and combiner element 160 and the light homogenizing element 140.

Figure 6A:
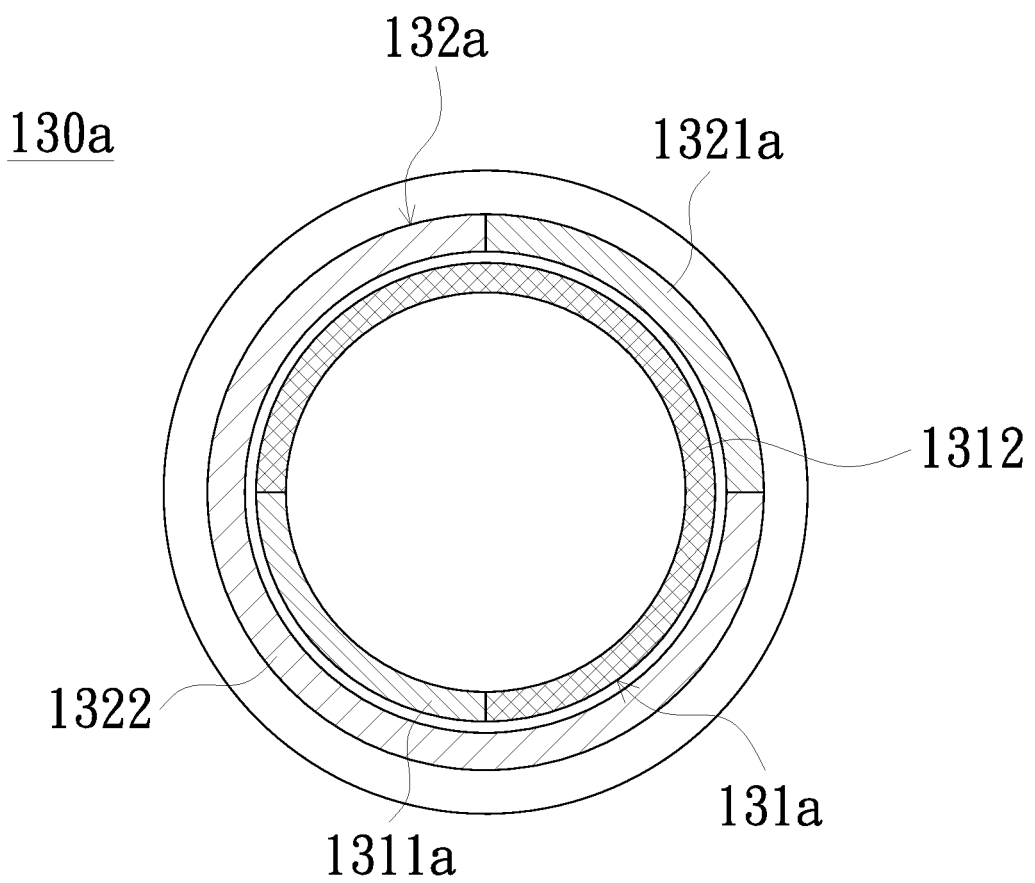
FIG. 6A is a schematic view of a wavelength-converting wheel according to another embodiment of the invention.
Figure 6B:
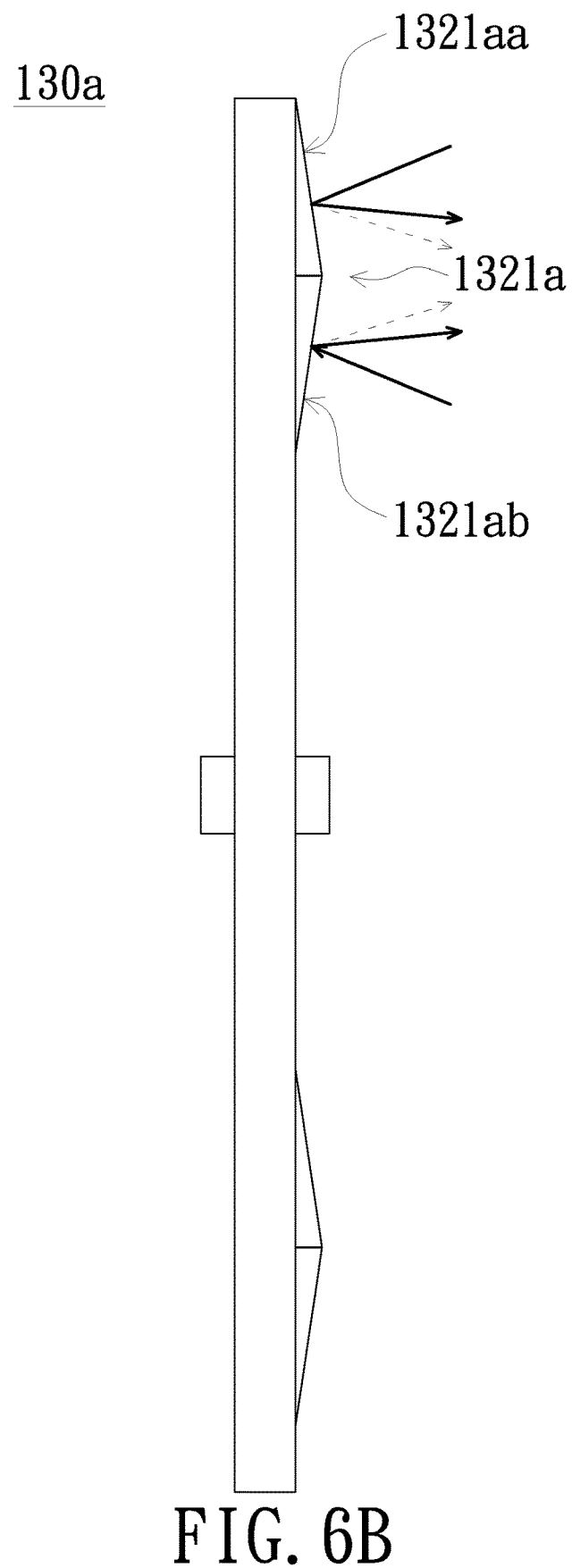
FIG. 6B is a schematic view of a reflective microstructure on a wavelength-converting wheel according to another embodiment of the invention.
Figure 6C:
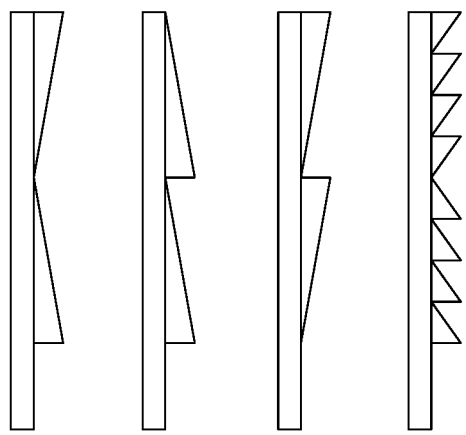
FIGS. 6C to 6H are schematic views of other types of reflective microstructure according to other embodiments of the invention.
Figure 6D:
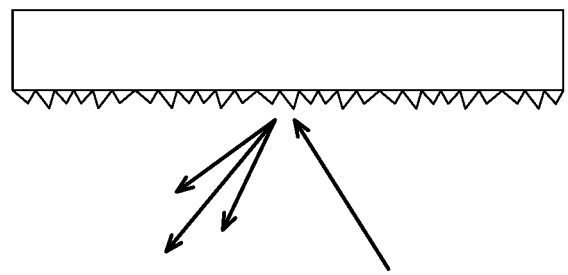
Figure 6E:
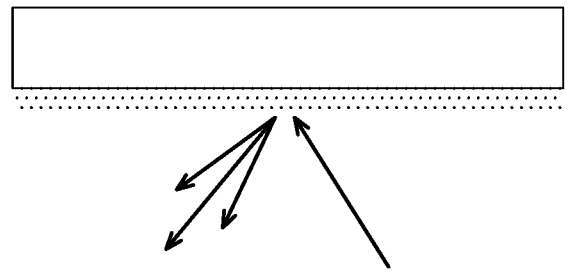
Figure 6F:
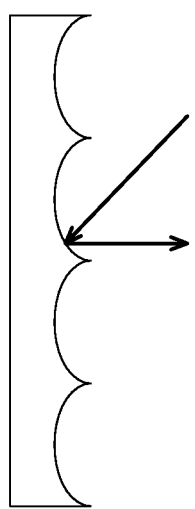
Figure 6G:
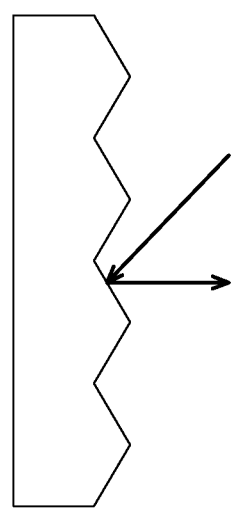
Figure 6H:
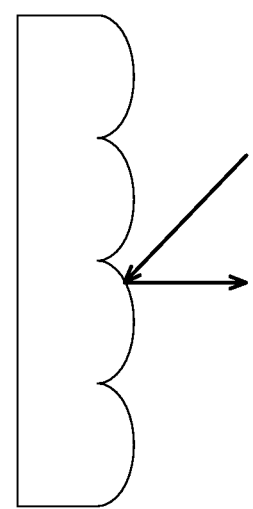

FIG. 6A is a schematic view of a wavelength-converting wheel according to another embodiment of the invention. FIG. 6B is a schematic view of a reflective microstructure on a wavelength-converting wheel according to another embodiment of the invention. Referring to FIGS. 6A and 6B, the wavelength-converting wheel 130*a* of the embodiment is similar to the wavelength-converting wheel 130 in structure, except that at least one of the first light reflecting region 1311*a* and the second light reflecting region 1321*a* is disposed with a reflective microstructure. For example, the reflective microstructure of the second light reflecting region 1321*a* in FIG. 6B has a first reflective surface 1321*aa* and a second reflective surface 1321*ab*. The first reflective surface 1321*aa* is inclined from the outer edge of the second light reflecting region 1321*a* toward the inner edge in a direction away from the wavelength-converting wheel 130. The second reflective surface 1321*ab* is inclined from the inner edge of the second light reflecting region 1321*a* toward the outer edge in a direction away from the wavelength-converting wheel 130.

When a light is incident, the reflective microstructure can change the angle of the reflected light and reduce the coherence of the light, so as to reduce the speckle phenomenon. In another embodiment, the reflective microstructure may be a scattering layer for diffusing the light angle to enhance light uniformity. FIGS. 6C to 6H are schematic views of other types of reflective microstructure according to other embodiments of the invention. Since the functions and advantages are the same as those of the above embodiments, no redundant detail is to be given herein.

Figure 7:
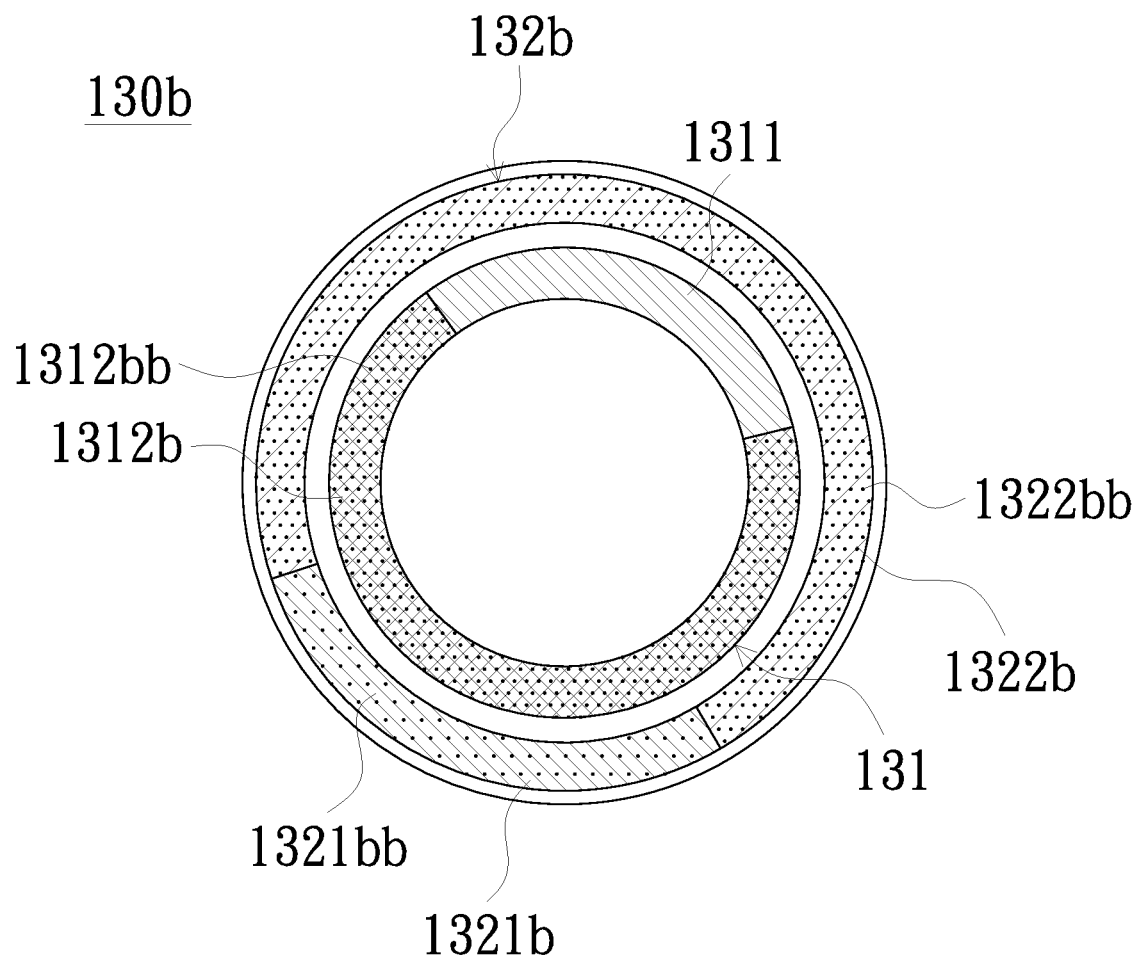
FIG. 7 is a schematic view of a wavelength-converting wheel according to another embodiment of the invention.
Figure 8:
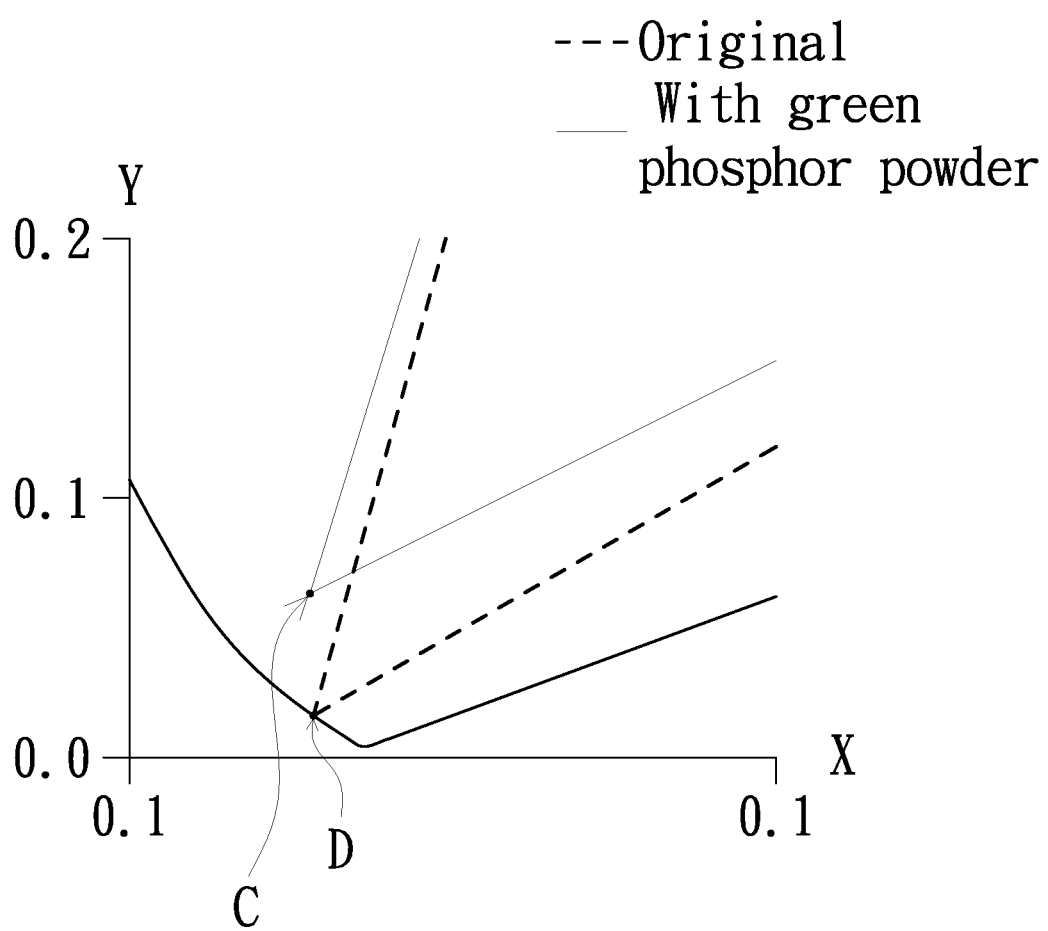
FIG. 8 is a chromaticity diagram of a second exciting beam according to an embodiment of the invention.

FIG. 7 is a schematic view of a wavelength-converting wheel according to another embodiment of the invention. FIG. 8 is a chromaticity diagram of a second exciting beam according to an embodiment of the invention. Referring first to FIG. 7, the wavelength-converting wheel 130*b* of the embodiment is similar to the wavelength-converting wheel 130 in structure, except that the first light converting region 1312*b* has a first light converting material 1312*bb*, the second light converting region 1322*b* has a second light converting material 1322*bb*, and the second light reflecting region 1321*b* has a third light converting material 1321*bb*. The distribution density of the third light converting material 1321*bb* of the second light reflecting region 1321*b* is lower than that of the second light converting material 1322*bb* of the second light converting region 1322*b*. For example, the wavelength-converting wheel 130*b* is, for example, a phosphor wheel, the second light converting material 1322*bb* and the third light converting material 1321*bb* are, for example, green phosphor powders, and the second exciting beam L2 is, for example, blue light. The third light converting material 1321*bb* is, for example, distributed in a small amount in the second light reflecting region 1321*b*. When the second exciting beam L2 is reflected by the second light reflecting region 1321*b*, the second exciting beam L2 excites the third light converting material 1321*bb* to generate a little green light, so that the first portion L2*a* of the first exciting beam L1 is mixed with a little green light, and thus, the effect that the color of the blue light changes toward green as illustrated in FIG. 8 can be produced. Please refer to FIG. 8 for the result of color change. The coordinate of point C is (0.1572, 0.018) and the coordinate of point D is (0.1559, 0.0646). In this way, it can improve the problem that blue light is easy to cause color point when emitting out and solve the problem that the blue light is purple.

Figure 9A:
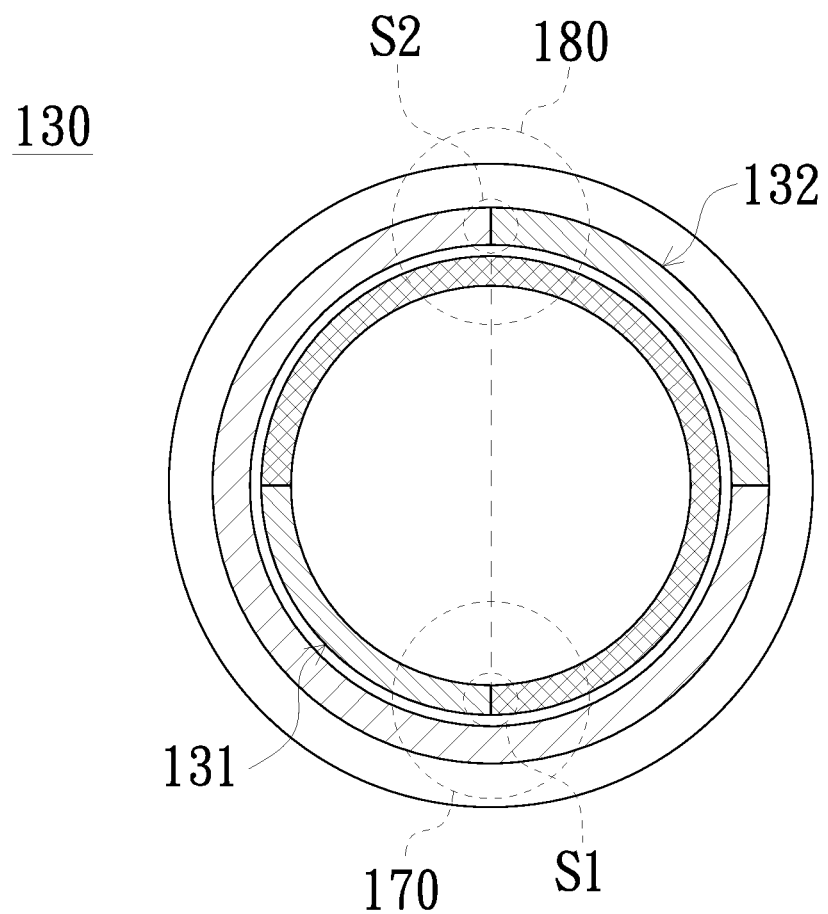
FIG. 9A is a schematic view of a wavelength-converting wheel and a light spot according to an embodiment of the invention.
Figure 9B:
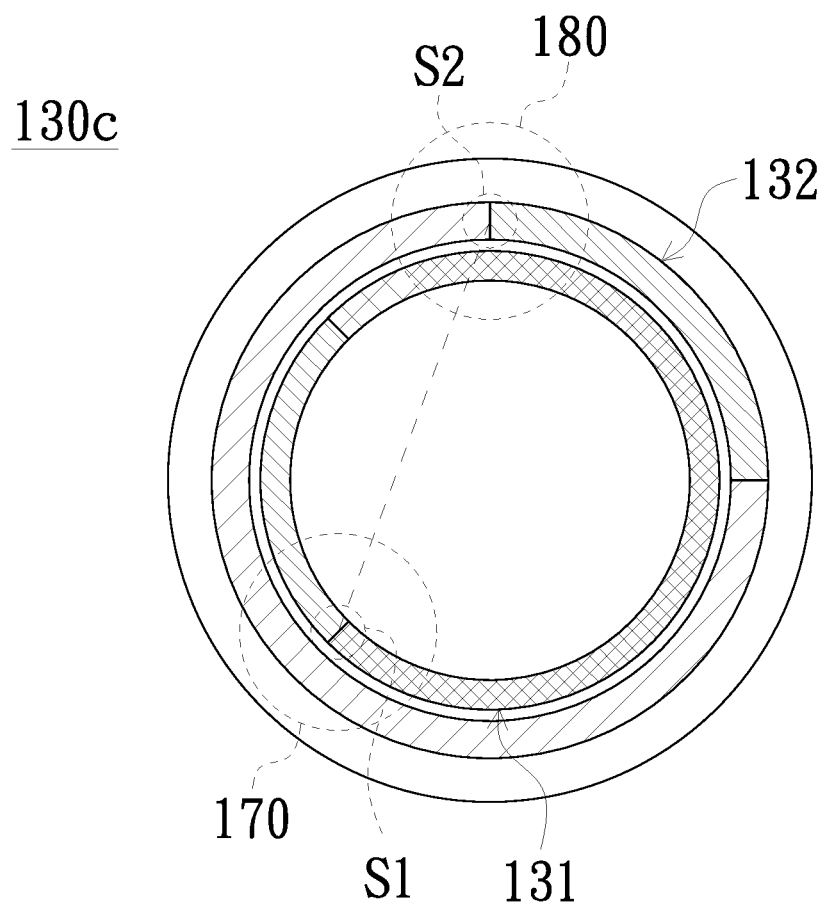
FIG. 9B is a schematic view of a wavelength-converting wheel and a light spot according to another embodiment of the invention.

FIG. 9A is a schematic view of a wavelength-converting wheel and a light spot according to an embodiment of the invention. FIG. 9B is a schematic view of a wavelength-converting wheel and a light spot according to another embodiment of the invention. Referring to FIGS. 9A, 9B and 1A, in the illumination system 100 of the embodiment, a light spot S1 is formed on the wavelength-converting wheel 130 when the first exciting beam L1 is irradiated to the first annular irradiation portion 131 via the first light condenser element 170; and a light spot S2 is formed on the wavelength-converting wheel 130 when the second exciting beam L2 is irradiated to the second annular irradiation portion 132 via the second light condenser element 180. The line connecting the center of the light spot S1 and the center of the light spot S2 may pass through the center of the wavelength-converting wheel 130 (as shown in FIG. 9A) or may not pass through the center of the wavelength-converting wheel 130 (as shown in FIG. 9B).

Figure 10A:
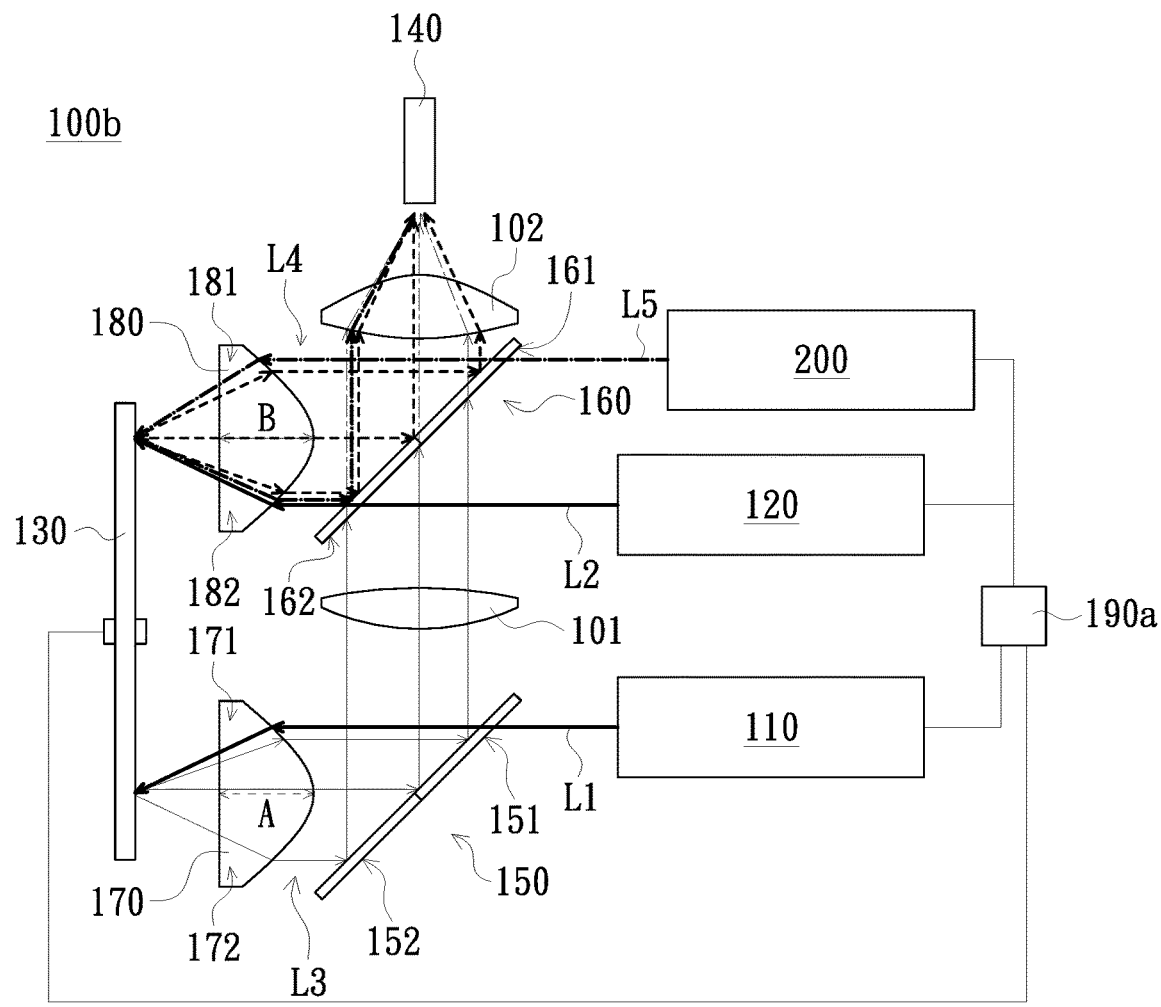
FIG. 10A is a schematic view of an optical path of an illumination system according to another embodiment of the invention.
Figure 10B:
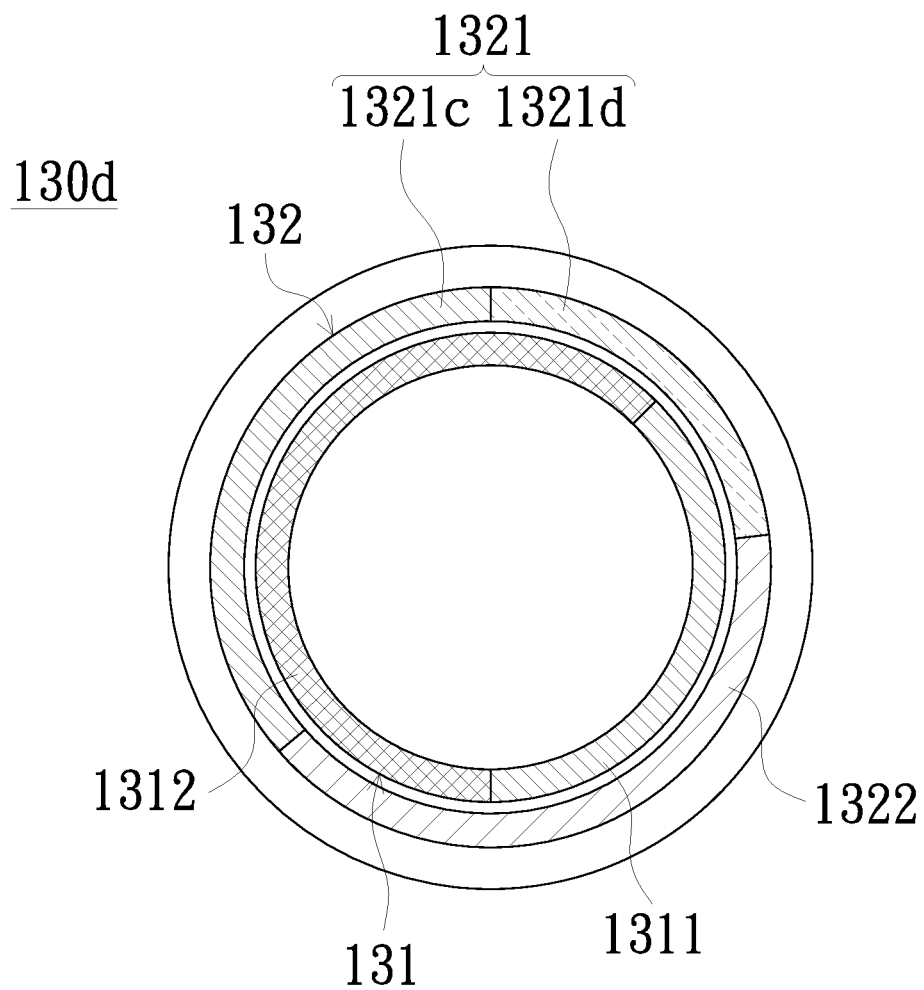
FIG. 10B is a schematic view of a wavelength-converting wheel according to another embodiment of the invention.

FIG. 10A is a schematic view of an optical path of an illumination system according to another embodiment of the invention. FIG. 10B is a schematic view of a wavelength-converting wheel according to another embodiment of the invention. Referring to FIGS. 10A and 10B, the illumination system 100*b* of the embodiment is similar to the illumination system 100 in structure and advantages, and only the main differences in the structure will be described below. The illumination system 100*b* of the embodiment further includes a first supplemental light source 200, compared to the illumination system 100. The first supplemental light source 200 is, for example, a laser light source or other solid state light source, but is not limited thereto. The first supplemental light source 200 is for providing a first supplemental beam L5. The second light reflecting region 1321 of the wavelength-converting wheel 130d may be further divided into a second exciting light reflecting region 1321c and a supplemental light reflecting region 1321d. The second exciting light reflecting region 1321c is for reflecting the second exciting beam L2. The supplemental light reflecting region 1321d is for reflecting the first supplemental beam L5. The first supplemental light source L5 and the third dichroic portion 161 correspond to the third partial part 181 of the second light condenser element 180, so that the first supplemental beam L5 provided by the first supplemental light source 200 passes through the third dichroic portion 161 and is transmitted to the third partial part 181 and is deflected by the third partial part 181 to the second annular irradiation portion 132 and is reflected by the supplemental light reflecting region 1321d to the fourth dichroic portion 162. The fourth dichroic portion 162 is for reflecting the first supplemental beam L5 to the light homogenizing element 140. The first converted beam L3 is also simultaneously transmitted to the light homogenizing element 140. Since the transmission path of the first converted beam L3 is the same as that of the above embodiment, no redundant detail is to be given herein. The first supplemental beam L5 provided by the first supplemental light source 200 may increase the color change of the color light or the brightness of the illumination system.

Figure 11:
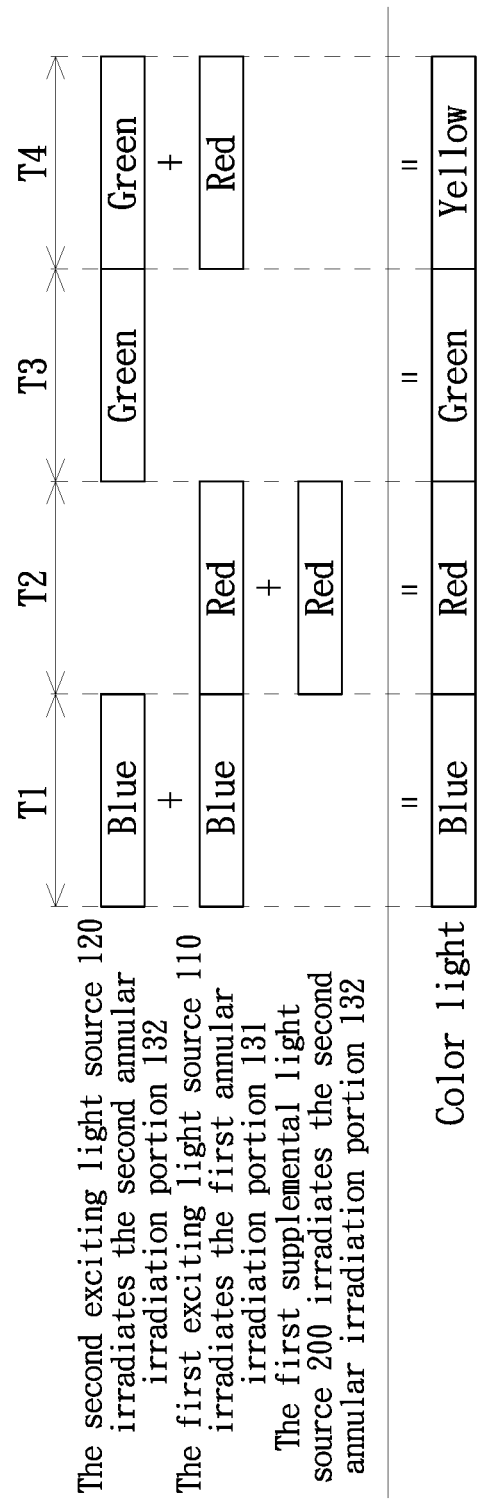
FIG. 11 is a schematic view showing the relationship between timing and color light of an illumination system according to an embodiment of the invention.

FIG. 11 is a schematic view showing the relationship between timing and color light of an illumination system according to an embodiment of the invention. Referring to FIGS. 10A, 10B and 11, the control unit 190a of the embodiment is similar to the control unit 190 in function and advantages, except that the control unit 190a of the embodiment may further control the switch of the first supplemental light source 200. The first supplemental beam L5 is, for example, red light having a substantially identical band spectrum with the first converted beam L3. The control unit 190a turns off the first supplemental light source 200 at the first timing T1, and therefore the illumination system 100b generates blue light. The control unit 190a turns on the first supplemental light source 200 at the second timing T2, so that the first supplemental beam L5 is irradiated to the supplemental light reflecting region 1321d, and therefore the illumination system 100b generates red light. The control unit 190a turns off the first supplemental light source 200 at the third timing, and therefore the illumination system 100b generates green light. The control unit 190a turns off the first supplemental light source 200 at the fourth timing T4, and therefore the illumination system 100b generates yellow light (green light plus red light).

Figure 12:
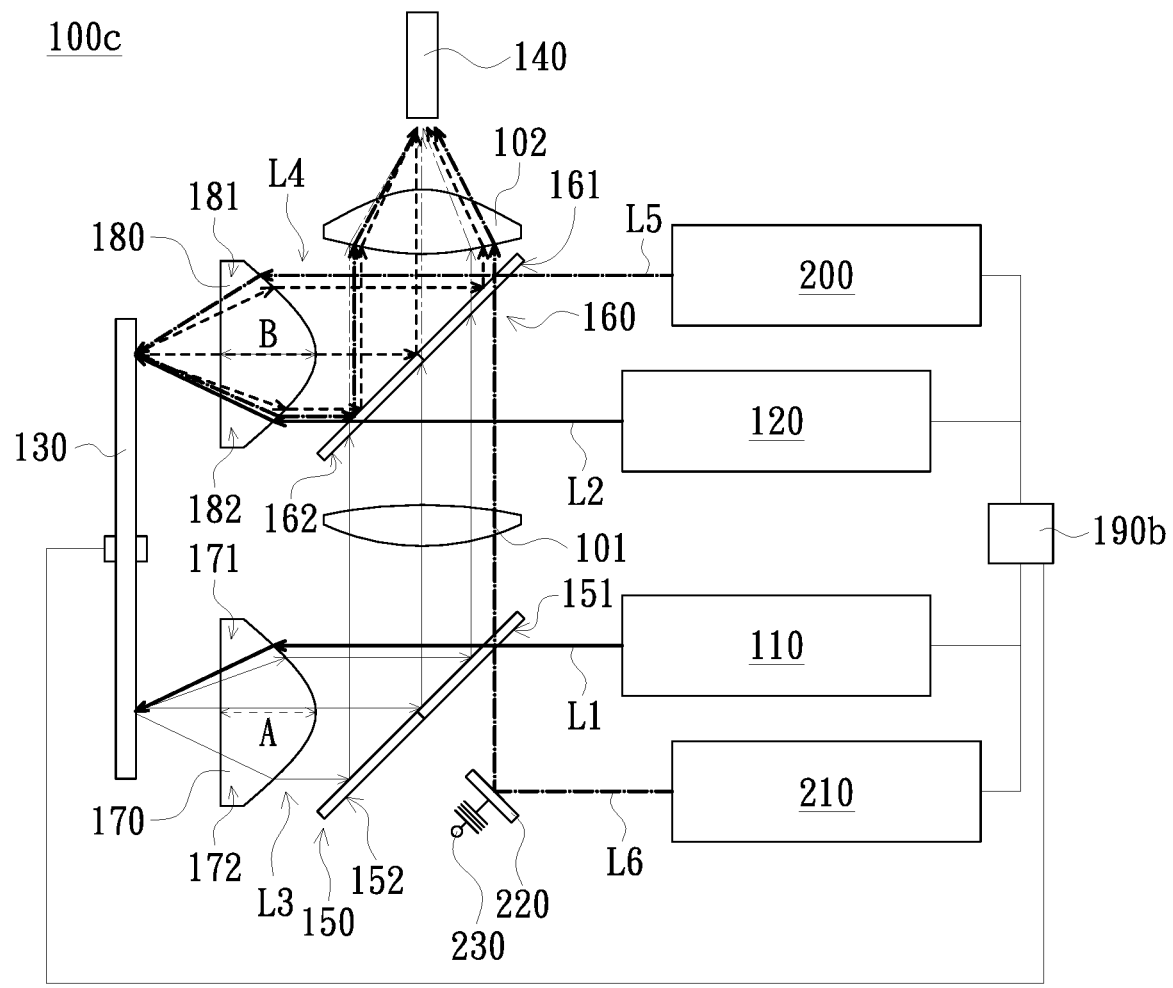
FIG. 12 is a schematic view of an optical path of an illumination system according to another embodiment of the invention.

FIG. 12 is a schematic view of an optical path of an illumination system according to another embodiment of the invention. Referring to FIGS. 12 and 10A, the illumination system 100c of the embodiment is similar to the illumination system 100b in structure and advantages, and only the main differences in structure will be described below. Compared to the illumination system 100b, the illumination system 100c of the embodiment further includes a second supplemental light source 210, a reflective element 220 and an actuating element 230. The second supplemental light source 210 is, for example, a laser light source or other solid state light source, but is not limited thereto. The second supplemental light source 210 is for providing the second supplemental beam L6 that passes through the first dichroic portion 151 and the third dichroic portion 161 and is transmitted to the light homogenizing element 140. The reflective element 220 is disposed on the transmission path of the second supplemental beam L6 and is for reflecting the second supplemental beam L6 to the first dichroic portion 151. The actuating element 230 is coupled to the reflective element 220 and is for driving reflective element 220 to swing. The embodiment does not limit the manner in which the actuating member 230 is coupled to the reflective element 220 as long as the reflective member 220 can swing. The reflective element 220 is, for example, a reflective sheet, a mirror or other element having a reflective function. The reflective element 220, which is driven by the actuating element 230 to swing, can reduce the coherence of the reflected light the speckle phenomenon. The second supplemental beam L6 provided by the second supplemental light source 210 may increase the color change of the color light or the brightness of the illumination system.

Figure 13:
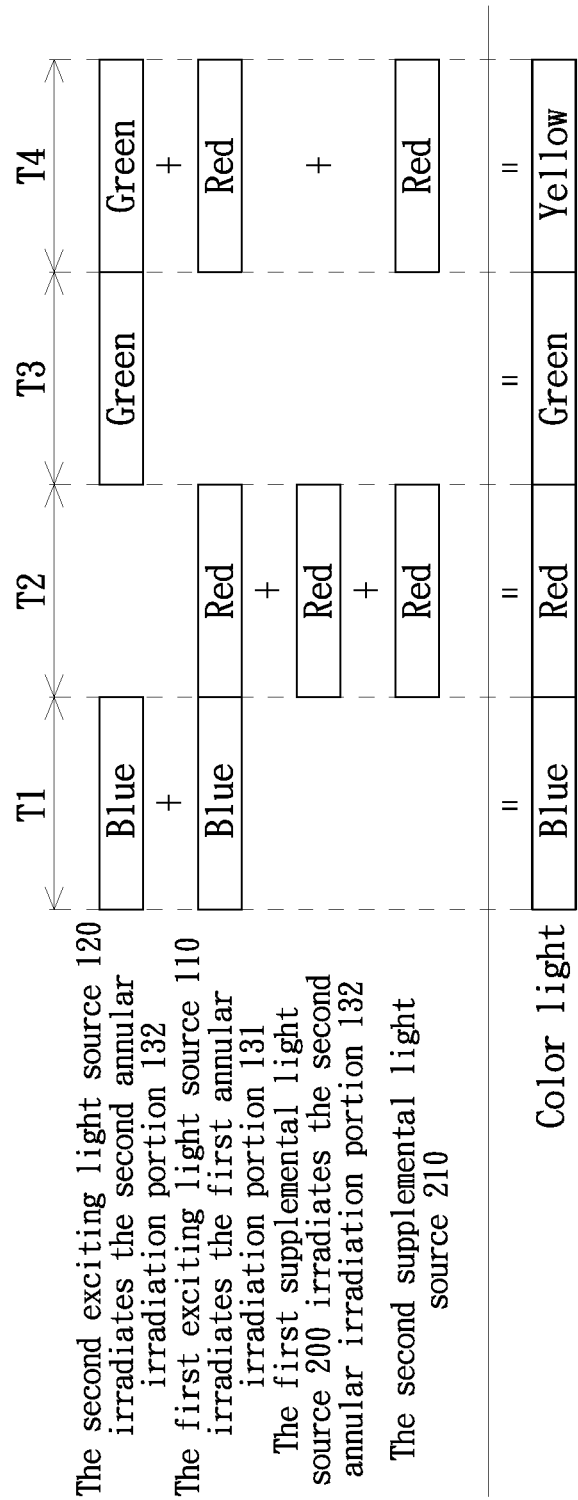
FIG. 13 is a schematic view showing the relationship between timing and color light of an illumination system according to another embodiment of the invention.

FIG. 13 is a schematic view showing the relationship between timing and color light of an illumination system according to another embodiment of the invention. Referring to FIGS. 12 and 13, the control unit 190b of the embodiment is similar to the control unit 190a in function and advantages, except that the control unit 190b of the embodiment may further control the switch of the second supplemental light source 210. The second supplemental beam L6 is, for example, red light. The control unit 190b turns off the second supplemental light source 210 at the first timing T1, and therefore the illumination system 100c generates blue light. The control unit 190b turns on the second supplemental light source 210 at the second timing T2, so that the second supplemental beam L6 is transmitted to the light homogenizing element 140, and therefore the illumination system 100b generates red light. The control unit 190b turns off the second supplemental light source 210 at the third timing T3, and therefore the illumination system 100c generates green light. The control unit 190b turns off the second supplemental light source 210 at the fourth timing T4, and therefore the illumination system 100c generates yellow light (green light plus red light).

Figure 14:
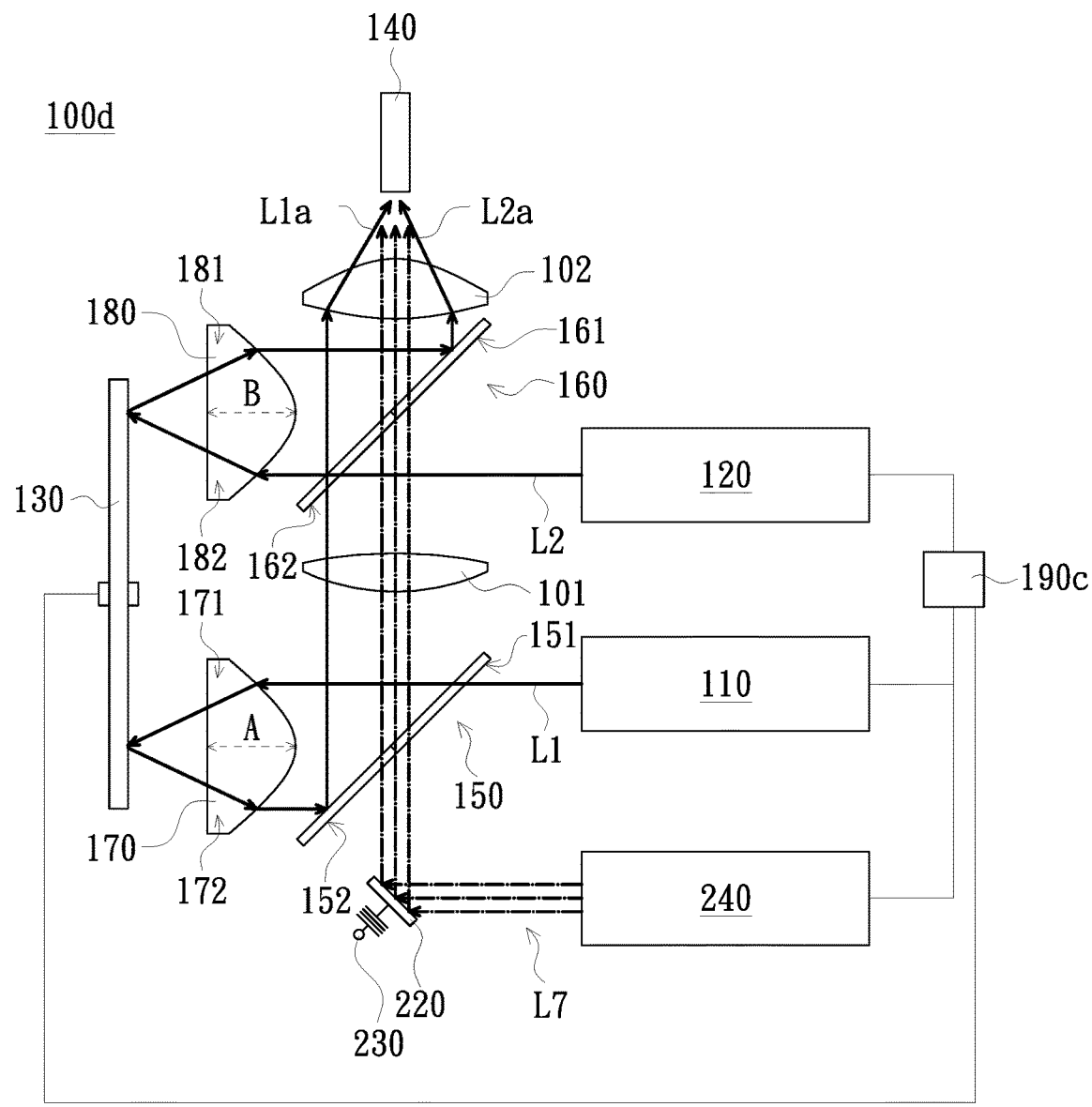
FIG. 14 is a schematic view of an optical path of an illumination system according to another embodiment of the invention.

FIG. 14 is a schematic view of an optical path of an illumination system according to another embodiment of the invention. Referring to FIGS. 14 and 1C, the illumination system 100d of the embodiment is similar to the illumination system 100 in structure and advantages, and only the main differences in structure will be described below. Compared to the illumination system 100, the illumination system 100d of the embodiment further includes a supplemental light source 240, a reflective element 220 and an actuating element 230. The supplemental light source 240 is, for example, a laser light source or other solid state light source, but is not limited thereto. The supplemental light source 240 is for providing a supplemental beam L7 that passes through the first beam splitter and combiner element 150 and the second beam splitter and combiner element 160 and is transmitted to the light homogenizing element 140. The reflective element 220 is disposed on the transmission path of the supplemental beam L7 and is for reflecting the supplemental beam L7 to the first beam splitter and combiner element 150. The actuating element 230 is coupled to the reflective element 220 and is for driving reflective element 220 to swing. The embodiment does not limit the manner in which the actuating member 230 is coupled to the reflective element 220 as long as the reflective member 220 can swing. The reflective element 220 is, for example, a reflective sheet, a mirror or other element having a reflective function. The reflective element 220, which is driven by the actuating element 230 to swing, can reduce the coherence of the reflected light the speckle phenomenon.

Figure 15:
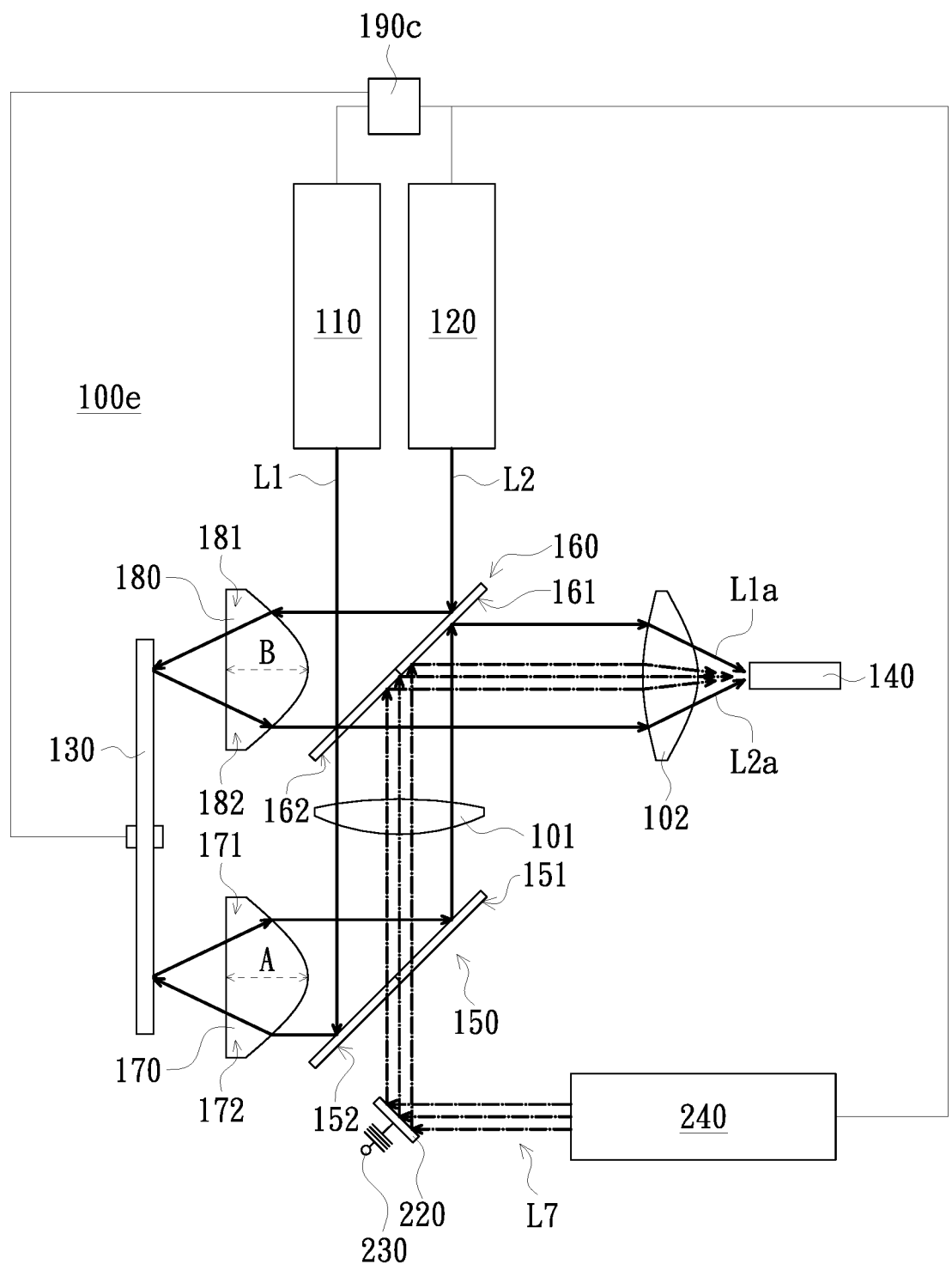
FIG. 15 is a schematic view of an optical path of an illumination system according to another embodiment of the invention.

FIG. 15 is a schematic view of an optical path of an illumination system according to another embodiment of the invention. Referring to FIGS. 15 and 1C, the illumination system 100e of the embodiment is similar to the illumination system 100a in structure and advantages, and only the main differences in structure will be described below. Compared to the illumination system 100a, the illumination system 100e of the embodiment further includes a supplemental light source 240, a reflective element 220 and an actuating element 230. The supplemental light source 240 is, for example, a laser light source or other solid state light source, but is not limited thereto. The supplemental light source 240 is for providing a supplemental beam L7 that passes through the first beam splitter and combiner element 150 and is reflected by the second beam splitter and combiner element 160 and is transmitted to the light homogenizing element 140. The reflective element 220 is disposed on the transmission path of the supplemental beam L7 and is for reflecting the supplemental beam L7 to the first beam splitter and combiner element 150. The actuating element 230 is coupled to the reflective element 220 and is for driving reflective element 220 to swing. The embodiment does not limit the manner in which the actuating member 230 is coupled to the reflective element 220 as long as the reflective member 220 can swing. The reflective element 220 is, for example, a reflective sheet, a mirror or other element having a reflective function. The reflective element 220, which is driven by the actuating element 230 to swing, can reduce the coherence of the reflected light the speckle phenomenon.

Figure 16A:
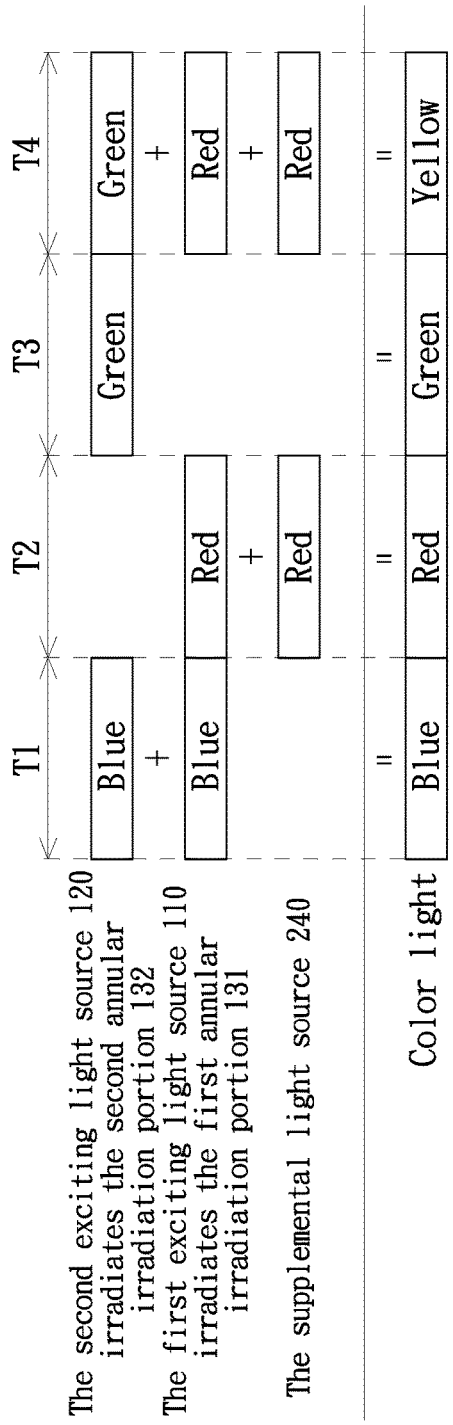
FIG. 16A is a schematic view showing the relationship between timing and color light of an illumination system according to another embodiment of the invention.

FIG. 16A is a schematic view showing the relationship between timing and color light of an illumination system according to another embodiment of the invention. Referring to FIGS. 14, 15 and 16A, the control unit 190c of the embodiment is similar to the control unit 190 in function and advantages, except that the control unit 190c of the embodiment may further control the switch of the supplemental light source 240. The supplemental beam L7 is, for example, red light. The control unit 190c turns off the supplemental light source 240 at the first timing T1, and therefore the illumination systems 100d and 100e generate blue light. The control unit 190c turns on the supplemental light source 240 at the second timing T2, so that the supplemental beam L7 is transmitted to the light homogenizing element 140, and therefore the illumination systems 100d and 100e generate red light. The control unit 190c turns off the supplemental light source 240 at the third timing T3, and therefore the illumination systems 100d and 100e generate green light. The control unit 190c turns off the supplemental light source 240 at the fourth timing T4, so that the supplemental beam L7 is transmitted to the light homogenizing element 140, and therefore the illumination systems 100d and 100e generate yellow light (green light plus red light).

Figure 16B:
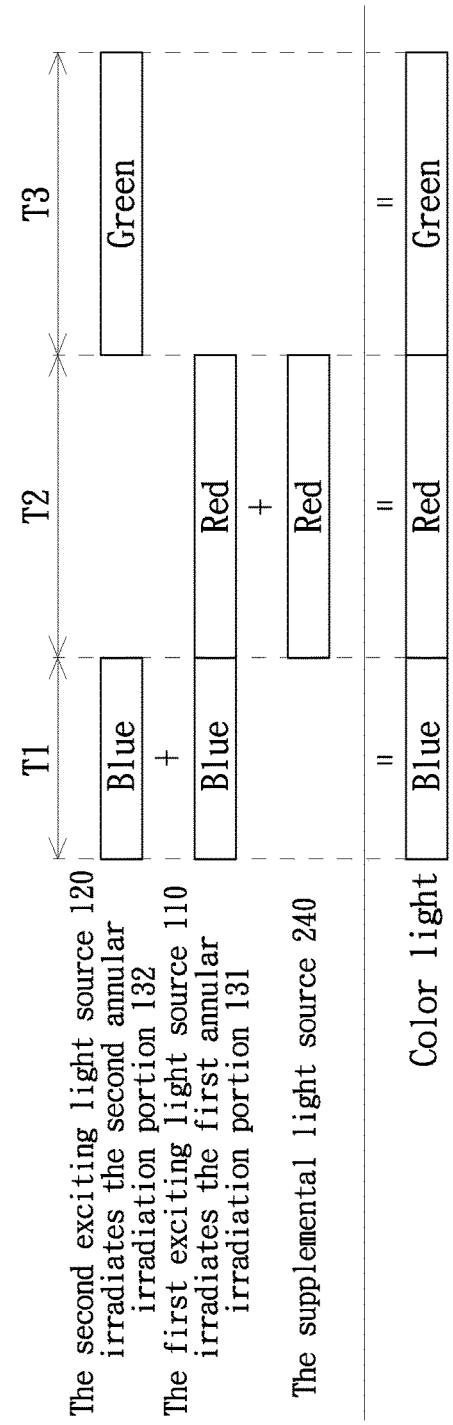
FIG. 16B is a schematic view showing the relationship between timing and color light of an illumination system according to another embodiment of the invention.

The control unit 190c may adjust the time length of different timings by controlling the first exciting light source 110, the second exciting light source 120 and the supplemental light source 240. The control unit 190c uses, for example, three timings as one cycle. FIG. 16B is a schematic view showing the relationship between timing and color light of an illumination system according to another embodiment of the invention. Referring to FIGS. 14, 15 and 16B, the control unit 190c of the embodiment turns off the supplemental light source 240 at the first timing T1, and therefore the illumination systems 100d and 100e generate green light. The control unit 190c turns on the supplemental light source 240 at the second timing T2, so that the supplemental beam L7 is transmitted to the light homogenizing element 140, and therefore the illumination systems 100d and 100e generate red light. The control unit 190c turns off the supplemental light source 240 at the third timing T3, and therefore the illumination systems 100d and 100e generate green light.

Figure 16C:
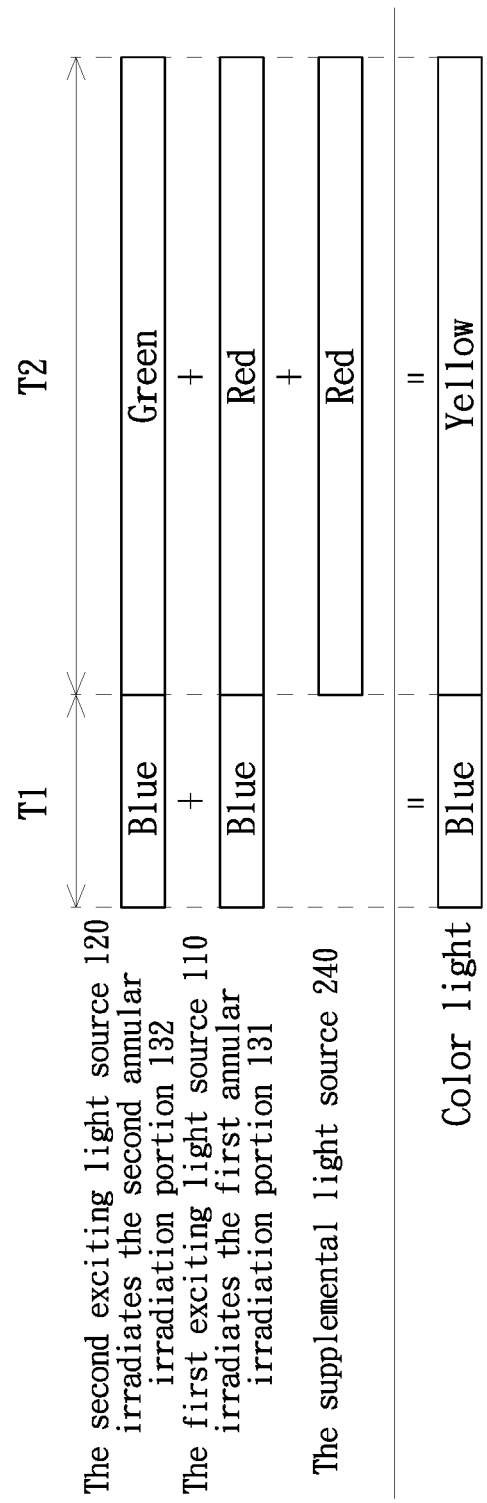
FIG. 16C is a schematic view showing the relationship between timing and color light of an illumination system according to another embodiment of the invention.

FIG. 16C is a schematic view showing the relationship between timing and color light of an illumination system according to another embodiment of the invention. Referring to FIGS. 14, 15 and 16C, the control unit 190c of the embodiment uses, for example, two timings as one cycle. The control unit 190c turns off the supplemental light source 240 at the first timing T1, and therefore the illumination system 100d or 100e generates blue light. The control unit 190c turns on the supplemental light source 240 at the second timing T2, so that the supplemental beam L7 is transmitted to the light homogenizing element 140, and therefore the illumination system 100d or 100e generates yellow light.

Figure 17A:
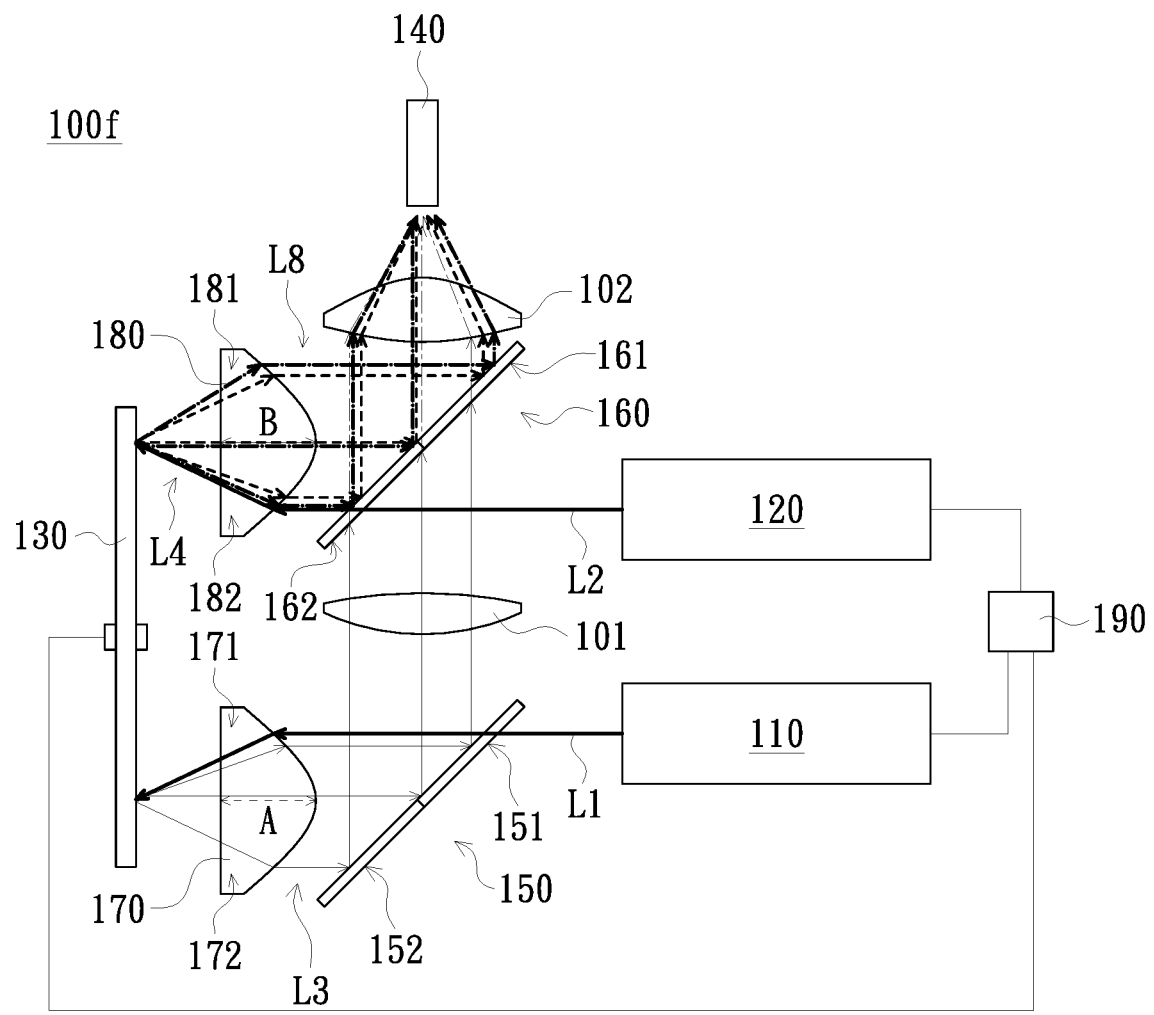
FIG. 17A is a schematic view of an optical path of an illumination system according to another embodiment of the invention.
Figure 17B:
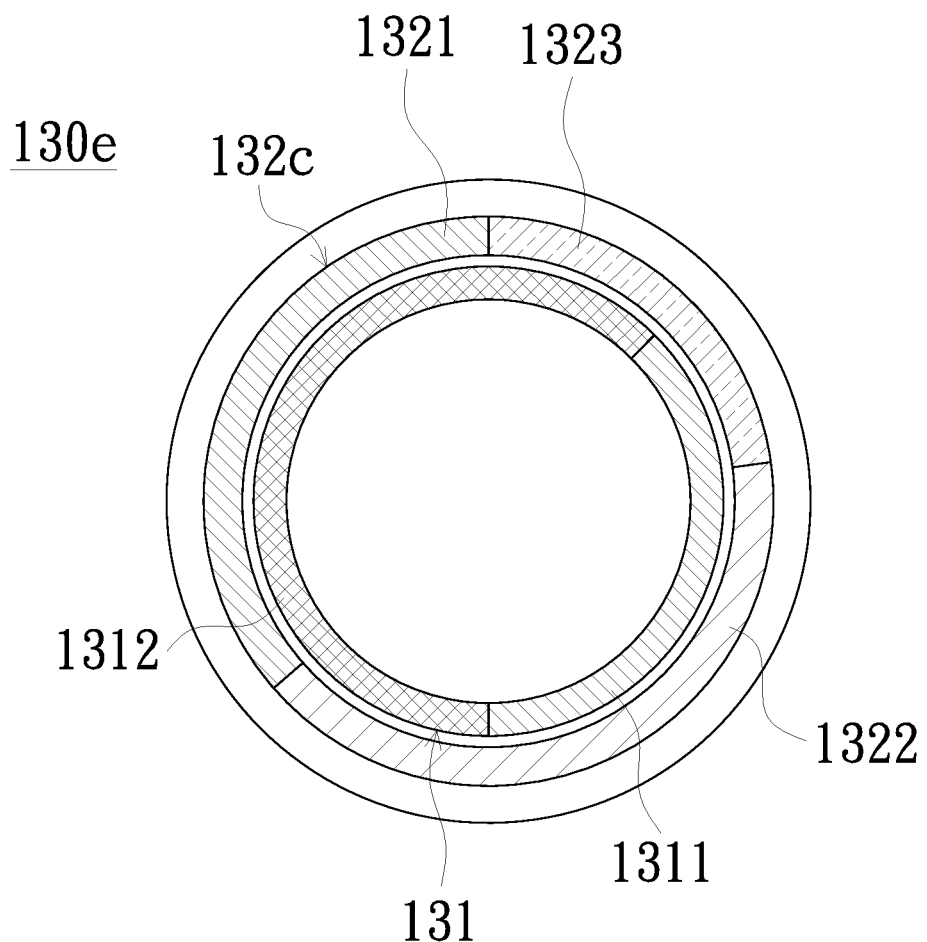
FIG. 17B is a schematic view of a wavelength-converting wheel according to another embodiment of the invention.

FIG. 17A is a schematic view of an optical path of an illumination system according to another embodiment of the invention. FIG. 17B is a schematic view of a wavelength-converting wheel according to another embodiment of the invention. Referring to FIGS. 17A and 17B, the illumination system 100f of the embodiment is similar to the illumination system 100 in structure and advantages, and only the main differences in structure will be described below. The second annular irradiation portion 132c of the wavelength-converting wheel 130e of the embodiment may further have a third light converting region 1323. The third light converting region 1323 is for converting the third portion of the second exciting beam L2 into the third converted beam L8 and reflecting the third converted beam L8 to the second beam splitter and combiner element 160. The second beam splitter and combiner element 160 is for reflecting the third converted beam L8 to the light homogenizing element 140. Hereinafter, the principle of penetration of the third dichroic portion 161 and the fourth dichroic portion 162 of the second beam splitter and combiner element 160 of the embodiment will be exemplified by color light.

Figure 18A:
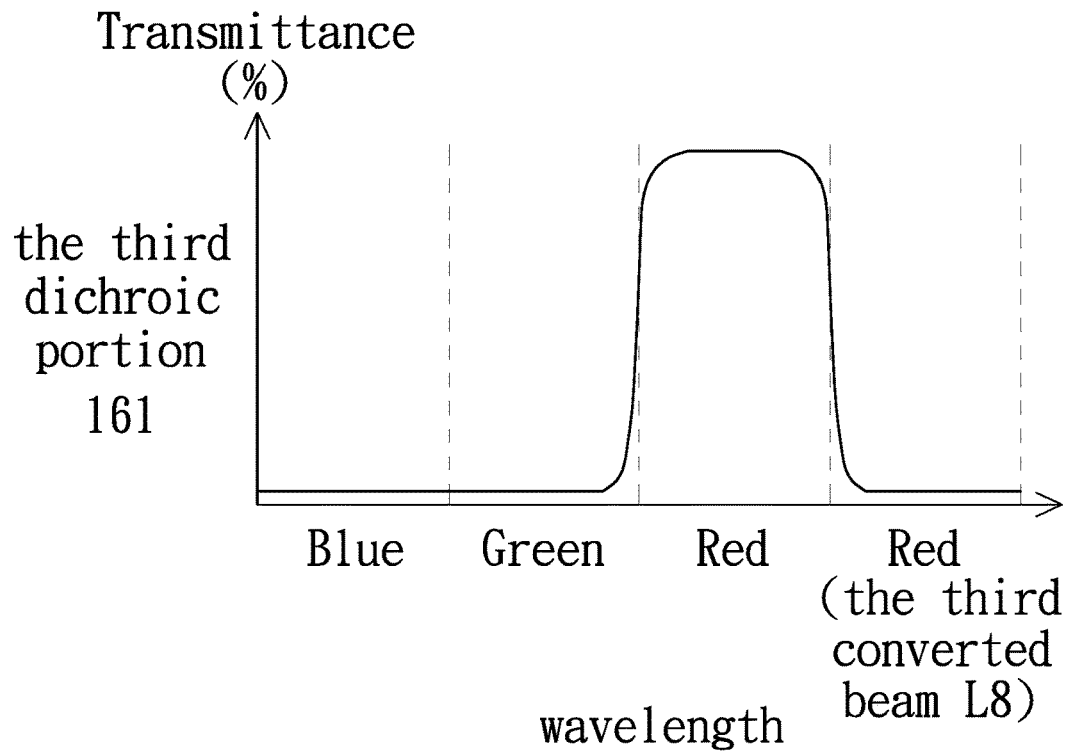
FIG. 18A is a schematic view showing the relationship between transmittance and wavelength of a third dichroic portion of a second beam splitter and combiner element according to another embodiment of the invention.
Figure 18B:
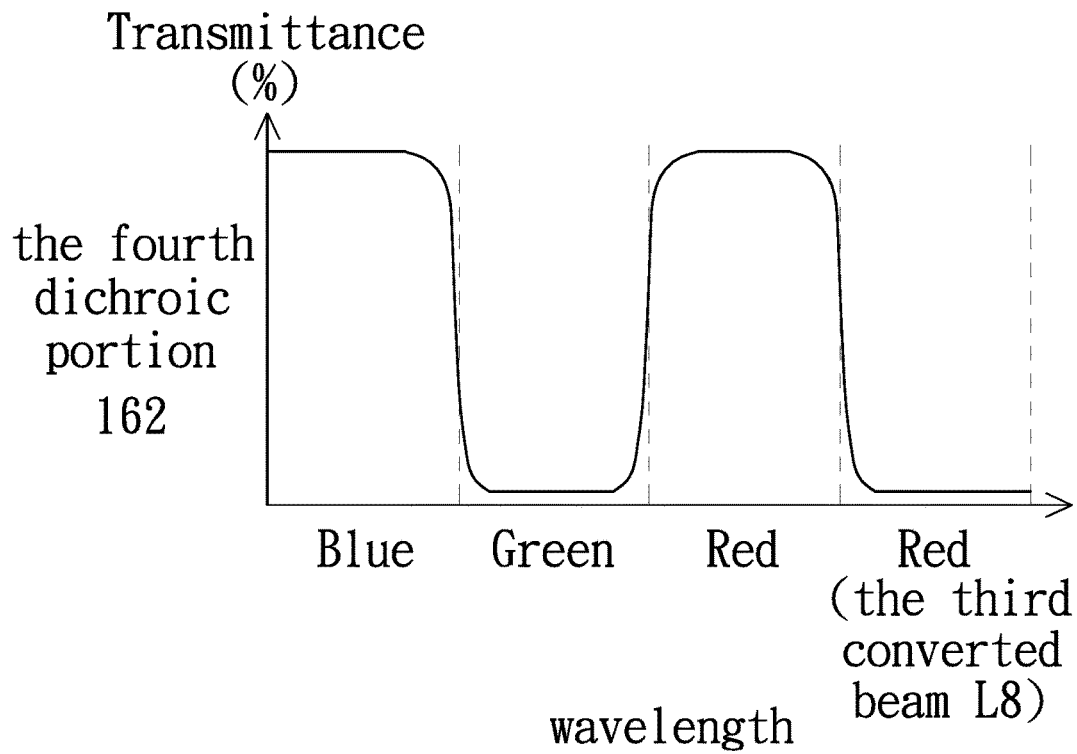
FIG. 18B is a schematic view showing the relationship between transmittance and wavelength of a fourth dichroic portion of a second beam splitter and combiner element according to another embodiment of the invention.

FIG. 18A is a schematic view showing the relationship between transmittance and wavelength of a third dichroic portion of a second beam splitter and combiner element according to another embodiment of the invention. FIG. 18B is a schematic view showing the relationship between transmittance and wavelength of a fourth dichroic portion of a second beam splitter and combiner element according to another embodiment of the invention. Referring to FIGS. 18A and 18B, the wavelength-converting wheel 130 of the embodiment is, for example, a phosphor wheel. The first exciting beam L1 is, for example, blue light, and the first light converting region 1312 is coated, for example, with a yellow powder or a red phosphor powder, so that the first converted beam L3 is yellow light or red light. When the first converted beam L3 is yellow light and is transmitted to the third dichroic portion 161 and the fourth dichroic portion 162, a partial wavelength band of the green light of the first converted beam L3 is reflected, and only a partial wavelength band of the red light can pass through, and therefore it is red light when incident on the light homogenizing element 140. The second exciting beam L2 is, for example, blue light, and the second light converting region 1322 is coated, for example, with a green phosphor powder, so that the second converted beam L4 is green light. The third light converting region 1323 is coated, for example, with a red phosphor powder or a red quantum dot, so that the third converted beam L8 is red light. The red light of the first converted beam L3 and the red light of the third converted beam L8 are, for example, different wavelengths. The third dichroic portion 161 of the embodiment is for allowing the red light of the first converted beam L3 to pass therethrough and reflecting the blue light, the green light and the red light of the third converted beam L8. The fourth dichroic portion 162 is for allowing the blue light and the red light of the first converted beam L3 to pass therethrough and reflecting the green light and the red light of the third converted beam L8.

Figure 19:
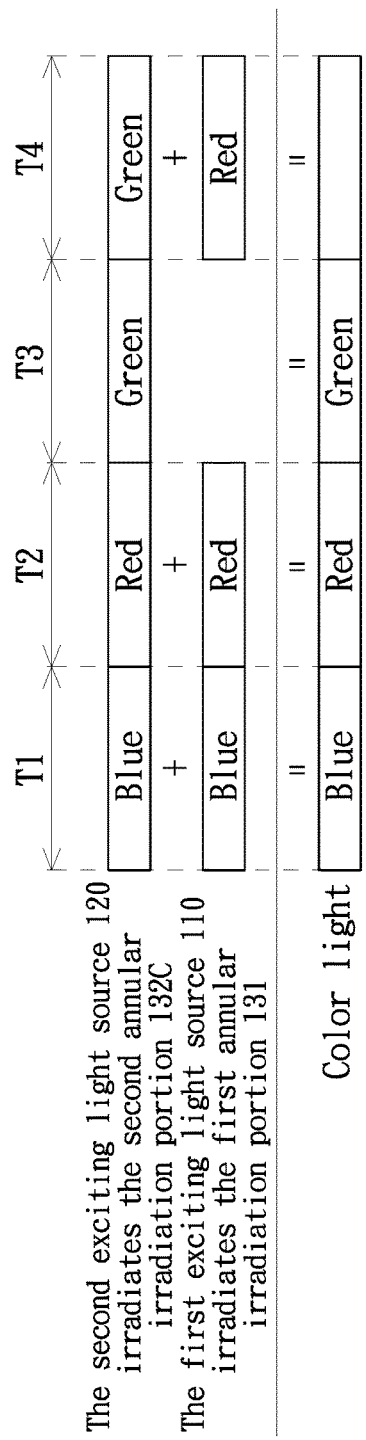
FIG. 19 is a schematic view showing the relationship between timing and color light of an illumination system according to another embodiment of the invention.

FIG. 19 is a schematic view showing the relationship between timing and color light of an illumination system according to another embodiment of the invention. Referring to FIG. 19, the control unit 190 of the embodiment turns on the first exciting light source 110 and the second exciting light source 120 at the first timing T1, so that the first exciting beam L1 is irradiated to the first light reflecting region 1311 to generate the first portion L1a of the first exciting beam L1, the second exciting beam L2 is irradiated to the second light reflecting region 1321 to generate the first portion L2a of the second exciting beam L2, and therefore the illumination system 100f generates blue light. The control unit 190 turns on the first exciting light source 110 at the second timing T2, so that the first exciting beam L1 is irradiated to the first light converting region 1312 to generate the first converted beam L3, the second exciting beam L2 is irradiated to the third light converting region 1323 to generate the first third converted beams L8, and therefore the illumination system 100f generates red light. The control unit 190 turns off the first exciting light source 110 and turns on the second exciting light source 120 at the third timing T3, so that the second exciting beam L2 is irradiated to the second light converting region 1322 to generate the second converted beam L4, and therefore the illumination system 100f generates green light. The control unit 190 turns on the first exciting light source 110 and the second exciting light source 120 at the fourth timing T4, so that the first exciting beam L1 is irradiated to the first light converting region 1312 to generate the first converted beam L3, the second exciting beam L2 is irradiated to the second light converting region 1322 to generate the second converted beam L4, and therefore the illumination system 100f generates yellow light (red light plus green light).

Figure 20:
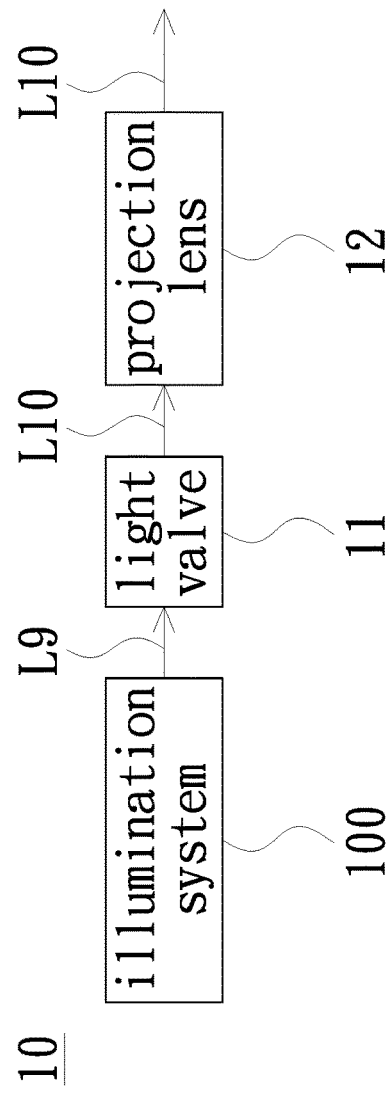
FIG. 20 is a block diagram of a projection apparatus according to an embodiment of the invention.

FIG. 20 is a block diagram of a projection apparatus according to an embodiment of the invention. Referring to FIGS. 1A, 1B and 20, the projection apparatus 10 of the embodiment includes the illumination system 100, a light valve 11 and a projection lens 12. The illumination system 100 is for providing an illumination beam L9. The illumination beam L9 includes the first portion L1a of the first exciting beam L1, the first converted beam L3, the first portion L2a of the second exciting beam L2, and the second converted beam L4. In other embodiments in which the illumination system 100 includes the first supplemental light source 200, the second supplemental light source 210 or the supplemental light source 220, the illumination beam L9 further includes the first supplemental beam L5, the second supplemental beam L6 or the supplemental beam L8. In the embodiment of the illumination system 100f, the illumination beam L9 may further include the third converted beam L7. The light valve 11 is disposed on the transmission path of the illumination beam L9 and is for converting the illumination beam L9 into an image beam L10. The projection lens 12 is disposed on the transmission path of the image beam L10 and is for allowing the image beam L10 to pass therethrough to be projected onto a screen (not shown), thereby forming an image frame on the screen. In an embodiment, since the illumination beam L9 generated by the illumination system 100 controlled by the control unit 190 can generate blue light, red light, green light and yellow light according to different timings, and therefore the projection apparatus 10 can also adjust the color proportion of the exiting light according to different design requirements. The projection apparatus 10 can also use the illumination systems 100a to 100f of the other embodiments described above.

In summary, the wavelength-converting wheel in the illumination system of the embodiment of the invention has a first annular irradiation portion and a second annular irradiation portion. By respectively adjusting the proportion and the position of the first light converting region in the first annular irradiation portion and the proportion and the position of the second light converting region in the second annular irradiation portion, different color lights can be generated at different timings according to subsequent control designs on the first exciting light source and the second exciting light source when the first exciting beam is irradiated to the first annular irradiation portion and the second exciting beam is irradiated to the second annular irradiation portion, so as to change the color proportion of the light emitted by the illumination system. With the design adjustment of the wavelength-converting wheel, the control unit of the embodiment of the invention can change the switches of the first exciting light source and the second exciting light source at different timings to increase the color proportion change of the light emitted by the illumination system. Since the projection apparatus of the embodiment of the invention uses the illumination system described above, the color proportion of the exiting light can be adjusted.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first exciting light source, the second exciting light source, the first light condenser element and the second light condenser element are only used for distinguishing various elements and do not limit the number of the elements.

What is claimed is:

1. An illumination system, comprising:
   a first exciting light source adapted to provide a first exciting beam;
   a second exciting light source adapted to provide a second exciting beam; and
   a wavelength-converting wheel disposed on a transmission path of the first exciting beam and the second exciting beam, wherein the wavelength-converting wheel has a first annular irradiation portion and a second annular irradiation portion, the first annular irradiation portion has a first light reflecting region and a first light converting region, the first light reflecting region is adapted to reflect the first exciting beam, the first light converting region is adapted to convert the first exciting beam into a first converted beam and reflect the first converted beam, the second annular irradiation portion has a second light reflecting region and a second light converting region, the second light reflecting region is adapted to reflect the second exciting beam, the second light converting region is adapted to convert the second exciting beam into a second converted beam and reflect the second converted beam.

2. The illumination system according to claim 1, further comprising:
   a light homogenizing element, disposed on a transmission path of the first exciting beam, the second exciting beam, the first converted beam and the second converted beam;
   a first beam splitter and combiner element, disposed between the first exciting light source and the wavelength-converting wheel, for guiding the first exciting beam from the first exciting light source to the wavelength-converting wheel and guiding the first exciting beam and the first converted beam to the light homogenizing element; and
   a second beam splitter and combiner element, disposed between the second exciting light source and the wavelength-converting wheel, for guiding the second exciting beam to the wavelength-converting wheel and guiding the second exciting beam and the second converted beam to the light homogenizing element.

3. The illumination system according to claim 2, further comprising:
   a first light condenser element, disposed between the wavelength-converting wheel and the first beam splitter and combiner element, for deflecting the first exciting beam to the first annular irradiation portion; and
   a second light condenser element, disposed between the wavelength-converting wheel and the beam splitter and combiner element, for deflecting the second exciting beam to the second annular irradiation portion.

4. The illumination system according to claim 3, wherein the second beam splitter and combiner element is disposed between the first beam splitter and combiner element and the light homogenizing element;
   the first light condenser element has a first optical axis, a first partial part and a second partial part, the first partial part and the second partial part are respectively located on two sides of the first optical axis, the second light condenser element has a second optical axis, a third partial part and a fourth partial part, the third partial part and the fourth partial part are respectively located on two sides of the second optical axis, and the first partial part and the fourth partial part are located between the first optical axis and the second optical axis;
   the first beam splitter and combiner element comprises a first dichroic portion and a second dichroic portion, the first exciting light source and the first dichroic portion correspond to the first partial part, so that the first exciting beam provided by the first exciting light source passes through the first dichroic portion and is transmitted to the first partial part and is deflected by the first partial part to the first annular irradiation portion, the first dichroic portion is for reflecting the first converted beam, and the second dichroic portion is for reflecting the first exciting beam and the first converted beam;
   the second beam splitter and combiner element comprises a third dichroic portion and a fourth dichroic portion, the third dichroic portion is for reflecting the second exciting beam and the second converted light beam and allowing a partial wavelength band of the first converted beam to pass therethrough, the second exciting light source and the fourth dichroic portion correspond to the fourth partial part, so that the second exciting beam provided by the second exciting light source passes through the fourth dichroic portion and is transmitted to the fourth partial part and is deflected by the fourth partial part to the second annular irradiation portion, the fourth dichroic portion is for allowing the first exciting beam and a partial wavelength band of the first converted beam to pass therethrough and reflecting the second converted beam.

5. The illumination system according to claim 4, further comprising a first supplemental light source, wherein the first supplemental light source is for providing a first supplemental beam, the first supplemental light source and the third dichroic portion correspond to the third partial part, so that the first supplemental beam provided by the first supplemental light source passes through the third dichroic portion and is transmitted to third partial part and is deflected by the third partial part to the second annular irradiation portion and is reflected by the second light reflecting region to the fourth dichroic portion, and the fourth dichroic portion is for reflecting the first supplemental beam to the light homogenizing element.

6. The illumination system according to claim 5, further comprising a second supplemental light source for providing a second supplemental beam, wherein the second supplemental beam passes through the first dichroic portion and the third dichroic portion and is transmitted to the light homogenizing element.

7. The illumination system according to claim 6, further comprising a reflective element and an actuating element, wherein the reflective element is disposed on a transmission path of the second supplemental beam and is for reflecting the second supplemental beam to the first dichroic portion, and the actuating element is coupled to the reflective element and is for driving the reflective element to swing.

8. The illumination system according to claim 4, further comprising a supplemental light source for providing a supplemental beam, wherein the supplemental beam passes through the first beam splitter and combiner element and the second beam splitter and combiner element and is transmitted to the light homogenizing element.

9. The illumination system according to claim 8, further comprising a reflective element and an actuating element, wherein the reflective element is disposed on a transmission path of the supplemental beam and is for reflecting the supplemental beam to the first beam splitter and combiner element, and the actuating element is coupled to the reflective element and is for driving the reflective element to swing.

10. The illumination system according to claim 4, wherein the second annular irradiation portion further has a third light converting region, the third light converting region is for converting a third portion of the second exciting beam into a third converted beam and reflecting the third converted beam to the second beam splitter and combiner element, and the second beam splitter and combiner element is for reflecting the third converted beam to the light homogenizing element.

11. The illumination system according to claim 3, wherein
 the second beam splitter and combiner element is disposed between the first beam splitter and combiner element and the first exciting light source as well as the second exciting light source, and the first exciting light source and the second exciting light source are located on same side of the second beam splitter and combiner element;
 the first light condenser element has a first optical axis, a first partial part and a second partial part, the first partial part and the second partial part are respectively located on two sides of the first optical axis, the second light condenser element has a second optical axis, a third partial part and a fourth partial part, the third partial part and the fourth partial part are respectively located on two sides of the second optical axis, and the first partial part and the fourth partial part are located between the first optical axis and the second optical axis;
 the first beam splitter and combiner element comprises a first dichroic portion and a second dichroic portion, the first exciting light source and the first dichroic portion correspond to the first partial part, so that the first exciting beam provided by the first exciting light reflected by the second dichroic portion and is transmitted to the second partial part and is deflected by the second partial part to the first annular irradiation portion, the first dichroic portion is for reflecting the first exciting beam, the first dichroic portion and the second dichroic portion are for reflecting a partial wavelength band of the first converted beam to the second beam splitter and combiner element, and the partial wavelength band of the first converted beam is then reflected to the light homogenizing element;
 the second beam splitter and combiner element has a third dichroic portion and a fourth dichroic portion, and the second exciting beam and the second converted beam are for passing through the fourth dichroic portion, the second exciting light source and the third dichroic portion correspond to the third partial part, so that the second exciting beam provided by the second exciting light source is reflected by the third dichroic portion and is transmitted to the third partial part is deflected by the third partial part to the second annular irradiation portion, the third dichroic portion is for reflecting the first exciting beam and allowing the second converted beam to pass therethrough.

12. The illumination system according to claim 11, further comprising a supplemental light source for providing a supplemental beam, wherein the supplemental beam passes through the first beam splitter and combiner element and is reflected by the second beam splitter and combiner element and is transmitted to the light homogenizing element.

13. The illumination system according to claim 1, wherein the first annular irradiation portion surrounds the second annular irradiation portion or the second annular irradiation portion surrounds the first annular irradiation portion.

14. The illumination system according to claim 1, wherein the first exciting beam and the second exciting beam are different wavelengths.

15. The illumination system according to claim 1, wherein the first light reflecting region is disposed along a first radius along a first arc and has a first central angle, the first light converting region is disposed along the first radius along a second arc and has a second central angle, the second light reflecting region is disposed along a second radius along a third arc and has a third central angle, the second light converting region is disposed along the second radius along a fourth arc and has a fourth central angle, the first central angle is less than the fourth central angle, and the third central angle is less than the second central angle.

16. The illumination system according to claim 1, wherein at least one of the first light reflecting region and the second light reflecting region is provided with a reflective microstructure.

17. The illumination system according to claim 1, wherein the first light converting region has a first light converting material, the second light converting region has a second light converting material, the second light reflecting region has a third light converting material, and a distribution density of the third light converting material of the second light reflecting region is lower than a distribution density of the second light converting material of the second light converting region.

18. A control unit for controlling, according to a timing, switches of the first exciting light source and the second exciting light source of the illumination system according to claim 1 to generate color lights of different colors.

19. The control unit according to claim 18, wherein
 the control unit turns on the first exciting light source and the second exciting light source at a first timing, so that the first exciting beam is irradiated to the first light reflecting region, and the second exciting beam is irradiated to the second light reflecting region;
 the control unit turns on the first exciting light source and turns off the second exciting light source at a second timing, so that the first exciting beam is irradiated to the first light converting region;
 the control unit turns off the first exciting light source and turns on the second exciting light source at a third timing, so that the second exciting beam is irradiated to the second light converting region; and
 the control unit turns on the first exciting light source and the second exciting light source at a fourth timing, so that the first exciting beam is irradiated to the first light converting region, and the second exciting beam is irradiated to the second light converting region.

20. The control unit according to claim 19, wherein the illumination system further comprises a first supplemental light source, the first supplemental light source is for providing a first supplemental beam, the control unit further controls a switch of the first supplemental light source, the control unit turns off the first supplemental light source at the first timing, the control unit turns on the first supplemental light source at the second timing, so that the first supplemental beam is irradiated to the second light reflecting region, the control unit turns off the first supplemental light source at the third timing, and the control unit turns off the first supplemental light source at the fourth timing.

21. The control unit according to claim 20, wherein the illumination system further comprises a light homogenizing element and a second supplemental light source, the light homogenizing element is disposed on a transmission path of the first exciting beam, the second exciting beam, the first converted beam and the second converted beam, the second supplemental light source is for providing a second supplemental beam, the control unit further controls a switch of the second supplemental light source, the control unit turns off the second supplemental light source at the first timing, the control unit turns on the second supplemental light source at the second timing, so that the second supplemental beam is transmitted to the light homogenizing element, the control unit turns off the second supplemental light source at the third timing, and the control unit turns off the second supplemental light source at the fourth timing.

22. The control unit according to claim 19, wherein the illumination system further comprises a light homogenizing element and a supplemental light source, the light homogenizing element is disposed on a transmission path of the first exciting beam, the second exciting beam, the first converted beam and the second converted beam, the supplemental light source is for providing a supplemental beam, the control unit further controls a switch of the supplemental light source, the control unit turns off the supplemental light source at the first timing, the control unit turns on the supplemental light source at the second timing, so that the supplemental beam is transmitted to the light homogenizing element, the control unit turns off the supplemental light source at the third timing, and the control unit turns on the supplemental light source at the fourth timing, so that the supplemental beam is transmitted to the light homogenizing element.

23. The control unit according to claim 18, wherein the second annular irradiation portion of the illumination system further has a third light converting region,
the control unit turns on the first exciting light source and the second exciting light source at a first timing, so that the first exciting beam is irradiated to the first light reflecting region, and the second exciting beam is irradiated to the second light reflecting region;
the control unit turns on the first exciting light source and the second exciting light source at a second timing, so that the first exciting beam is irradiated to the first light converting region, and the second exciting beam is irradiated to the third light converting region;
the control unit turns off the first exciting light source and turns on the second exciting light source at a third timing, so that the second exciting beam is irradiated to the second light converting region; and
the control unit turns on the first exciting light source and the second exciting light source at a fourth timing, so that the first exciting beam is irradiated to the first light converting region, and the second exciting beam is irradiated to the second light converting region.

24. The control unit according to claim 18, wherein
the control unit turns on the first exciting light source and the second exciting light source at a first timing, so that the first exciting beam is irradiated to the first light reflecting region, and the second exciting beam is irradiated to the second light reflecting region;
the control unit turns on the first exciting light source and turns off the second exciting light source at a second timing, so that the first exciting beam is irradiated to the first light converting region; and
the control unit turns off the first exciting light source and turns on the second exciting light source at a third timing, so that the second exciting beam is irradiated to the second light converting region.

25. The control unit according to claim 24, wherein the illumination system further comprises a light homogenizing element and a supplemental light source, the light homogenizing element is disposed on a transmission path of the first exciting beam, the second exciting beam, the first converted beam and the second converted beam, the supplemental light source is for providing a supplemental beam, the control unit further controls a switch of the supplemental light source, the control unit turns off the supplemental light source at the first timing, the control unit turns on the supplemental light source at the second timing, so that the supplemental beam is transmitted to the light homogenizing element, and the control unit turns off the supplemental light source at the third timing.

26. The control unit according to claim 18, wherein
the control unit turns on the first exciting light source and the second exciting light source at a first timing, so that the first exciting beam is irradiated to the first light reflecting region, and the second exciting beam is irradiated to the second light reflecting region; and
the control unit turns on the first exciting light source and the second exciting light source at a second timing, so that the first exciting beam is irradiated to the first light converting region, and the second exciting beam is irradiated to the second light converting region.

27. The control unit according to claim 26, wherein the illumination system further comprises a light homogenizing element and a supplemental light source, the light homogenizing element is disposed on a transmission path of the first exciting beam, the second exciting beam, the first converted beam and the second converted beam, the supplemental light source is for providing a supplemental beam, the control unit further controls a switch of the supplemental light source, the control unit turns off the supplemental light source at the first timing, and the control unit turns on the supplemental light source at the second timing, so that the supplemental beam is transmitted to the light homogenizing element.

28. A projection apparatus, comprising:
an illumination system adapted to provide an illumination beam, the illumination system comprising:
a first exciting light source adapted to provide a first exciting beam;
a second exciting light source adapted to provide a second exciting beam; and
a wavelength-converting wheel disposed on a transmission path of the first exciting beam and the second exciting beam, wherein the wavelength-converting wheel has a first annular irradiation portion and a second annular irradiation portion, the first annular irradiation portion has a first light reflecting region and a first light converting region, the first light reflecting region is adapted to reflect the first exciting beam, the first light converting region is adapted to convert the first exciting beam into a first converted beam and reflect the first converted beam, the second annular irradiation portion has a second light reflecting region and a second light converting region, the second light reflecting region is adapted to reflect the second exciting beam, the second light converting region is adapted to convert the second exciting beam into a second converted beam and reflect the second converted beam, wherein the illumination beam comprises the first exciting beam, the first converted beam, the second exciting beam, and the second converted beam;
a light valve, disposed on a transmission path of the illumination beam and adapted to convert the illumination beam into an image beam; and
a projection lens, disposed on a transmission path of the image beam and adapted to allow the image beam to pass therethrough.

* * * * *